United States Patent
Shimizu et al.

(10) Patent No.: US 8,184,341 B2
(45) Date of Patent: May 22, 2012

(54) IMAGE READING APPARATUS, IMAGE READING METHOD, AND STORAGE MEDIUM

(75) Inventors: Koji Shimizu, Tokyo (JP); Hidetoshi Tanno, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 576 days.

(21) Appl. No.: 12/207,094

(22) Filed: Sep. 9, 2008

(65) Prior Publication Data
US 2009/0067014 A1 Mar. 12, 2009

(30) Foreign Application Priority Data

Sep. 10, 2007 (JP) .................................. 2007-234225
Sep. 10, 2007 (JP) .................................. 2007-234226

(51) Int. Cl.
*H04N 1/40* (2006.01)
*H04N 1/04* (2006.01)
*G06F 3/12* (2006.01)

(52) U.S. Cl. ........................ 358/3.23; 358/498; 358/1.15

(58) Field of Classification Search .................... 358/1.6, 358/3.28, 1.15
See application file for complete search history.

(56) References Cited

U.S. PATENT DOCUMENTS

| | | | | |
|---|---|---|---|---|
| 7,697,162 B2* | 4/2010 | Yamamizu | ..................... | 358/1.6 |
| 7,847,981 B2* | 12/2010 | Igarashi | ..................... | 358/3.28 |
| 2008/0130025 A1 | 6/2008 | Yamamizu | | |
| 2008/0130942 A1 | 6/2008 | Kitani | | |

FOREIGN PATENT DOCUMENTS

JP 7-110641 A 4/1995

* cited by examiner

*Primary Examiner* — Charlotte M Baker
*Assistant Examiner* — Rury Grisham
(74) *Attorney, Agent, or Firm* — Canon U.S.A., Inc. IP Division

(57) ABSTRACT

An image reading apparatus includes a document feeding unit, a reading unit, and a control unit configured to operate in a first reading mode in which the control unit causes the reading unit to move to read the document while holding the document in a stationary state and in a second reading mode in which the control unit causes the reading unit in a stationary state to read the document while causing the document feeding unit to convey the document. The control unit causes the reading unit to read the paper fingerprint information from the document in one of the first reading mode and the second reading mode. After completing reading of the paper fingerprint information, the control unit causes the reading unit to read the image from the document in the other of the first reading mode and the second reading mode.

2 Claims, 34 Drawing Sheets

FIG.9
REGISTERED PAPER FINGERPRINT INFORMATION
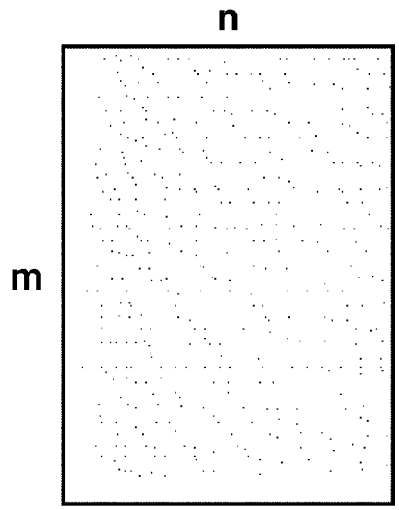
NEWLY OBTAINED PAPER FINGERPRINT INFORMATION
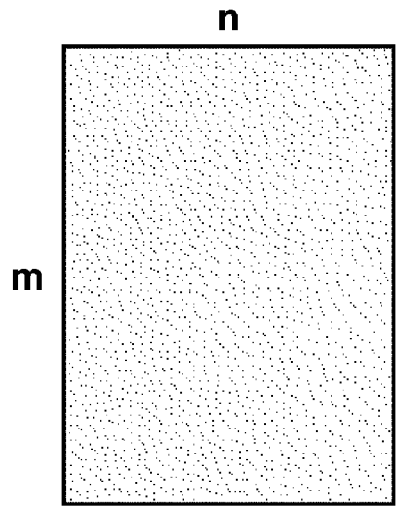

ILLUSTRATING HOW
TO OBTAIN $E_{1\times1}$

ILLUSTRATING HOW TO OBTAIN $E_{n\times 1}$

ILLUSTRATING HOW
TO OBTAIN $E_{2n-1} \times 1$

ILLUSTRATING HOW
TO OBTAIN E$_{1\times 2}$

ILLUSTRATING HOW
TO OBTAIN $E_{2n-1\times 2}$

ILLUSTRATING HOW TO OBTAIN $E_{n \times m}$

ILLUSTRATING HOW TO OBTAIN $E_{2n-1 \times 2m-1}$

IMAGE READING APPARATUS, IMAGE READING METHOD, AND STORAGE MEDIUM

BACKGROUND OF THE INVENTION

1. Field of the Invention

The present invention relates to an image reading apparatus capable of processing paper fingerprint information, a method for the image reading apparatus, and a storage medium storing a program realizing the image reading method.

2. Description of the Related Art

Internet-based digital technologies enable users to easily acquire various types of information. In this respect, to prevent leakage of information, reliable security technologies for information processing devices are recently required.

Some security technologies can guarantee authenticity of a document sheet or a print sheet used in an image processing apparatus, such as a copying machine or a multifunction peripheral (MFP). For example, a conventional security technology uses paper fingerprint information because paper includes numerous plant fibers having a size of 20 to 30 microns. Plant fibers, in an entangled state, form a random pattern, which can be generally referred to as "paper fingerprint information." Like a fingerprint, paper fingerprint information is unique to each sheet. An example method for guaranteeing the authenticity includes acquiring (registering) paper fingerprint information and performing collation.

A reading apparatus including an optical unit can perform registration and collation of paper fingerprint information. To acquire paper fingerprint information, the reading apparatus detects a shade pattern of plant fibers in a white area of paper. To this end, the optical unit reduces the quantity of light emitted toward a document when the reading apparatus reads paper fingerprint information, compared to a light quantity level for an ordinary image reading operation.

To acquire paper fingerprint data (paper fingerprint information), a conventional method includes setting a small gain adjustment value for an image signal when a reading apparatus reads paper fingerprint information, or decreasing the light quantity of a lamp in an optical unit.

As discussed in Japanese Patent Application Laid-Open No. 07-110641, a document feeder can operate in both a fixed-reading mode and a feeding-reading mode. In the fixed-reading mode, the document feeder stops a document on a document positioning glass plate while an optical reading device moves to read an image on the document. In the feeding-reading mode, the optical reading device performs image reading processing in a stationary state while the document feeder conveys the document.

A machine model, if operable in both the fixed-reading mode and the feeding-reading mode, can flexibly switch its operation mode between the fixed-reading mode and the feeding-reading mode if a user changes the type of a copy mode. After a reading apparatus completes image reading processing according to the fixed-reading mode while moving its optical unit, the reading apparatus returns the optical unit to the home position to start reading an image on the next document. On the other hand, if a reading apparatus performs image reading processing in the feeding-reading mode while conveying a document, document replacement time decreases.

However, the above-described conventional reading method includes nothing about reading of paper fingerprint information. If a reading apparatus reads an image of a document after completing the registration and collation of paper fingerprint information, the reading apparatus performs reading processing for acquiring paper fingerprint data and for acquiring image data independently. Thus, the method cannot realize a high-speed document reading operation.

If a document feeder performs an image reading operation after completing registration and collation of paper fingerprint information, a user is required to set a document twice on a document positioning glass plate. Thus, this process is time consuming.

A conventional document feeder can acquire both paper fingerprint data and image data if the document feeder performs reading processing twice in the fixed-reading mode. However, in this case, the document feeder moves an optical unit twice along a document to perform scanning of the document. Therefore, it takes a long time to complete the reading and document replacement processing.

Furthermore, a conventional document feeder can use a reversing path to read paper fingerprint data and image data from a document in the feeding-reading mode. This method also requires a long time to accomplish document replacement because the document feeder reverses each document in the reversing path.

Moreover, if a document feeder includes another optical sensor dedicated to acquire paper fingerprint information, the cost would increase.

SUMMARY OF THE INVENTION

Exemplary embodiments of the present invention are directed to an image reading apparatus capable of effectively reading paper fingerprint information of an image, a method for the image reading apparatus, and a storage medium storing a program realizing the image reading method.

According to an aspect of the present invention, an image reading apparatus includes a document feeding unit configured to convey a document to a reading position, a reading unit configured to read an image and paper fingerprint information from the document, and a control unit configured to operate in a first reading mode in which the control unit causes the reading unit to move to read the document while causing the document feeding unit to hold the document in a stationary state and in a second reading mode in which the control unit causes the reading unit in a stationary state to read the document while causing the document feeding unit to convey the document, wherein the control unit causes the reading unit to read the paper fingerprint information from the document in one of the first reading mode and the second reading mode, and after completing reading of the paper fingerprint information, the control unit causes the reading unit to read the image from the document in the other of the first reading mode and the second reading mode; according to another aspect of the present invention, an image reading apparatus includes a document feeding unit configured to convey a document to a reading position, a reading unit configured to read an image and paper fingerprint information from the document, and a control unit configured to cause the reading unit in a stationary state to read paper fingerprint information from the document while causing the document feeding unit to convey the document, wherein, after the document feeding unit stops conveying the document and the reading unit reaches a predetermined position in front of a leading edge of the document, the control unit causes the reading unit to read the image from the document while causing the document feeding unit to resume conveying the document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 9 illustrates registered paper fingerprint information and newly acquired paper fingerprint information.

DETAILED DESCRIPTION OF THE EMBODIMENTS

Figure 1:
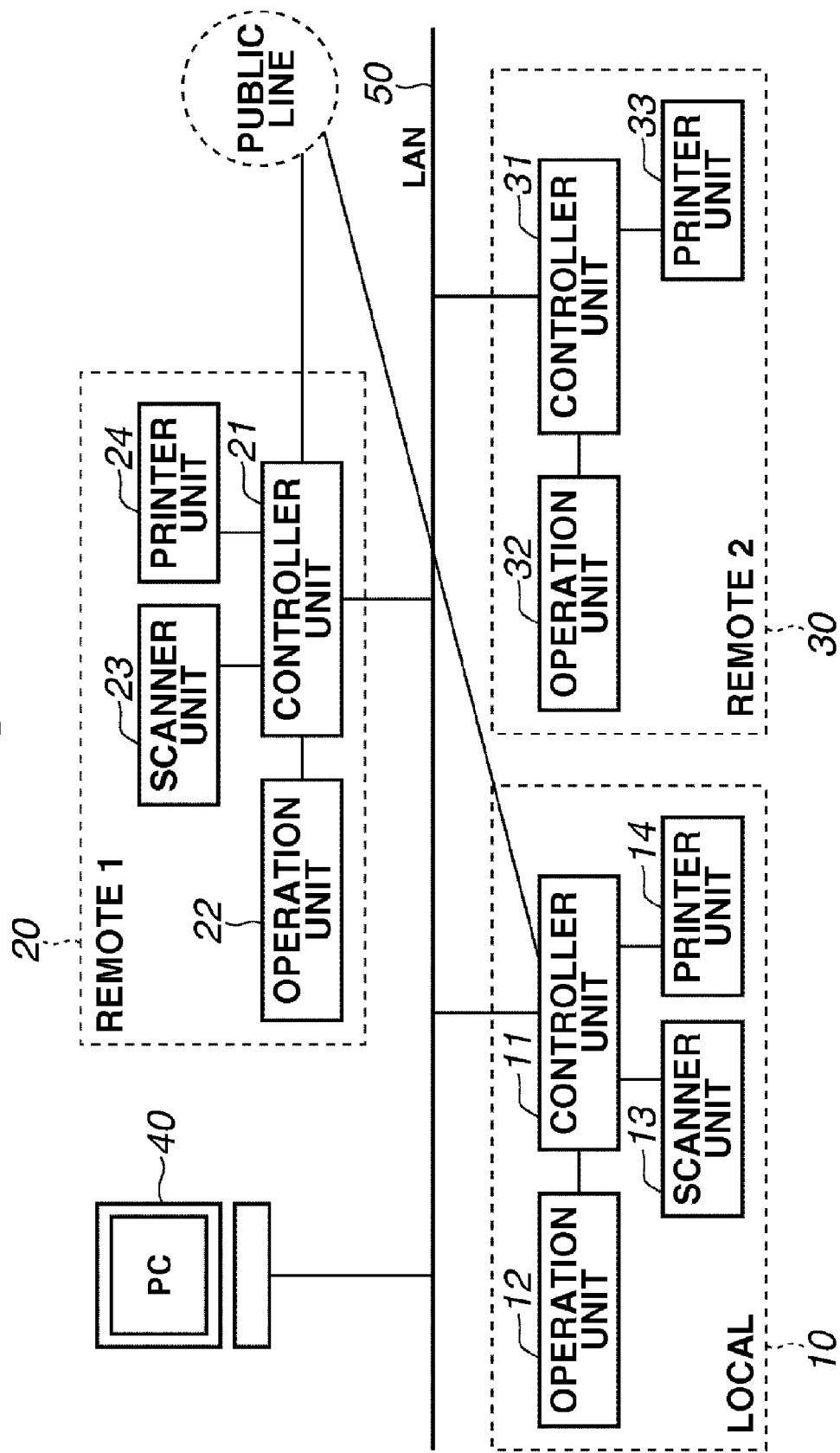
FIG. 1 illustrates a system including an image forming apparatus, which serves as an image reading apparatus according to an exemplary embodiment of the present invention.

The following description of exemplary embodiments is illustrative in nature and is in no way intended to limit the scope of the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

FIG. 1 is a block diagram illustrating a system including an image forming apparatus, which serves as an image reading apparatus according to an exemplary embodiment of the present invention. The system includes a host computer (hereinafter, referred to as "personal computer (PC)") 40 and a plurality of image forming apparatuses 10, 20, and 30, which are connected via a local area network (LAN) 50.

The number of apparatuses included in the system can be arbitrarily changed. The method for connecting a plurality of apparatuses is not limited to the use of LAN. For example, the LAN 50 is replaceable with a wide area network (WAN) represented by a public line or other network, universal serial bus (USB) or other serial transmission system, Centronics interface or Small Computer System Interface (SCSI) or other parallel type transmission system.

The PC 40 is operable as a personal computer. The PC 40 can transmit and receive files and electronic mails via the LAN 50 or WAN according to File Transfer Protocol (FTP) or Server Message Block (SMB) protocol. Furthermore, the PC 40 includes a printer driver that can send print commands to the image forming apparatuses 10, 20, and 30.

The image forming apparatuses 10 and 20 include similar constituent elements. The image forming apparatus 30 is an image forming apparatus having only a print function and does not include a scanner unit. The image forming apparatus 10 includes a scanner unit 13 serving as an image input device, a printer unit 14 serving as an image output device, a controller unit 11, and an operation unit 12 serving as a user interface (UI). The controller unit 11 controls various operations performed by the image forming apparatus 10.

The image forming apparatus 20 includes a scanner unit 23 serving as an image input device, a printer unit 24 serving as an image output device, a controller unit 21, and an operation unit 22 serving as a user interface (UI). The controller unit 21 controls various operations performed by the image forming apparatus 20.

The image forming apparatus 30 includes a printer unit 33 serving as an image output device, a controller unit 31 configured to control various operations performed by the image forming apparatus 30, and an operation unit 32 serving as a user interface (UI).

Figure 2:
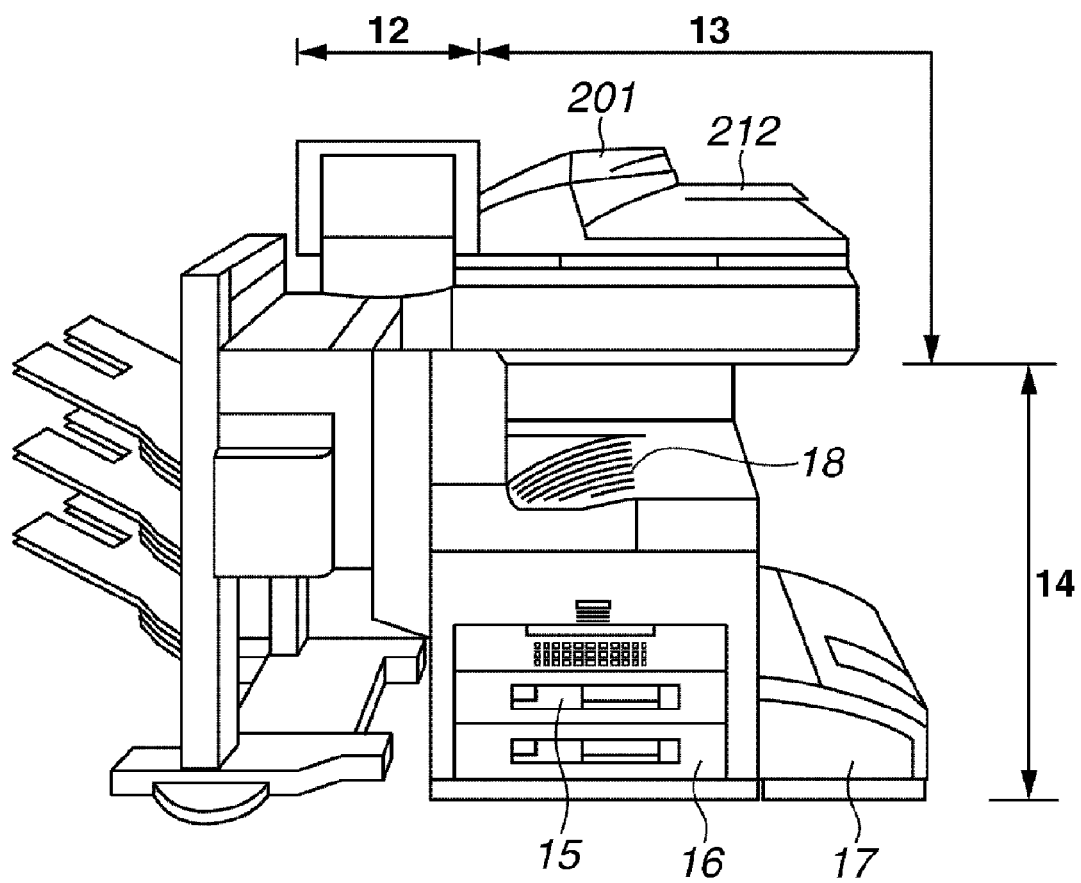
FIG. 2 illustrates an image forming apparatus.

Hereinafter, to simplify the description, FIG. 2 illustrates only the image forming apparatus 10. The scanner unit 13 includes a document feeder 201 and an optical unit 212 (document reading unit). The optical unit 212 includes a line sensor. If photoelectric elements constituting a line sensor are different in sensitivity, the optical unit 212 may erroneously recognize pixels as having different densities even if the density of each pixel on a document is the same.

Therefore, the scanner unit 13 initially performs exposure scanning on a white board (uniform white board), converts the quantity of reflection light obtained by the exposure scanning into an electric signal, and outputs the electric signal to the controller unit 11.

As described below, the controller unit 11 includes a shading correction unit 500 (FIG. 5) configured to recognize differences in sensitivity of the optical unit 212 based on an electric signal obtained by the scanner unit 13. The shading correction unit 500 corrects the value of an electric signal obtained by scanning an image on a document based on the recognized sensitivity differences.

Figure 3:
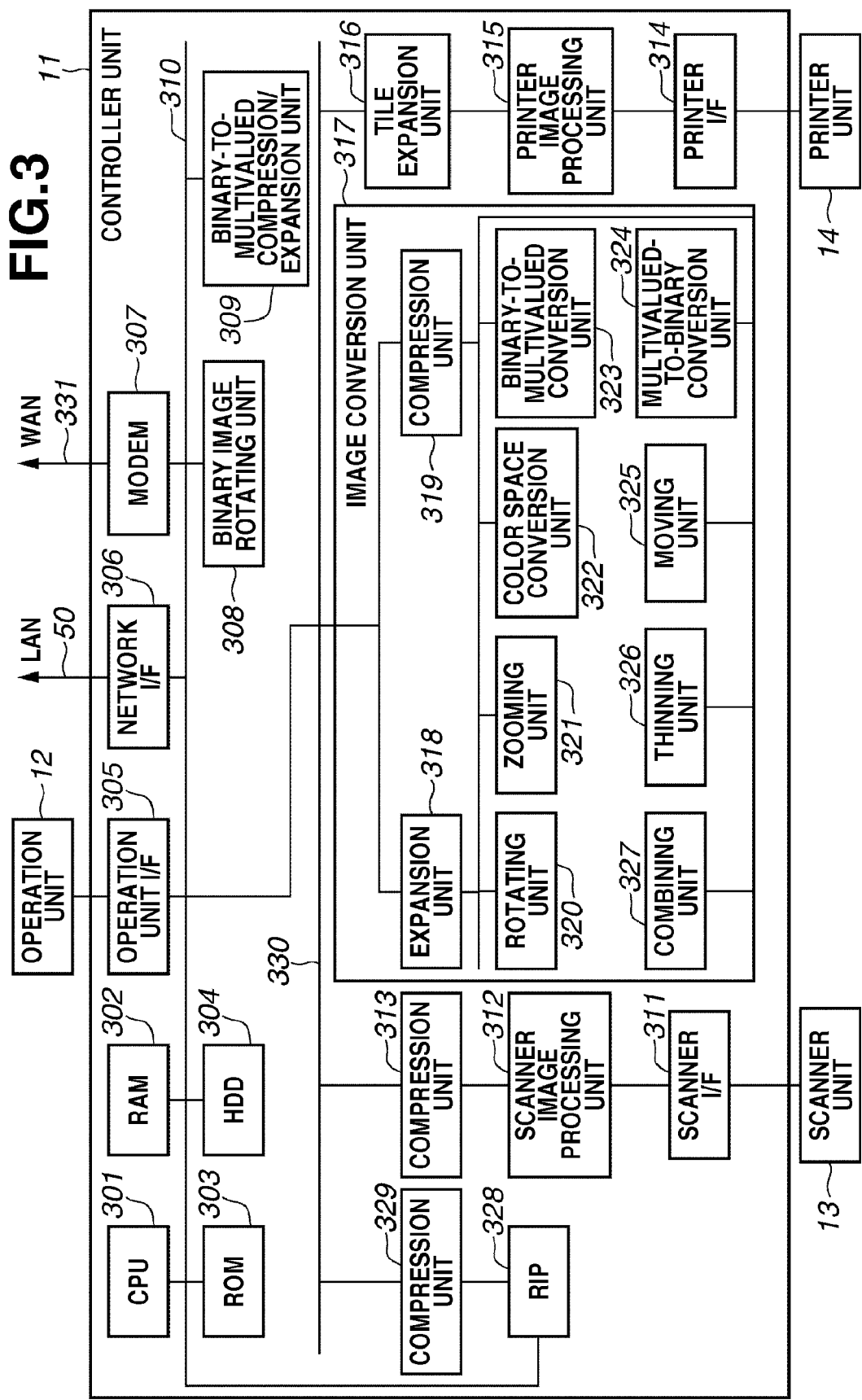
FIG. 3 is a block diagram illustrating an example controller unit of an image forming apparatus.

Furthermore, the shading correction unit 500 performs gain adjustment based on information received from a central processing unit (CPU) 301 provided in the controller unit 11 (FIG. 3). The shading correction unit 500 performs gain adjustment for each electric signal obtained by scanning a document to determine how electric signal values are allocated to luminance signal values having 0 to 255 levels. Through the gain adjustment, the shading correction unit 500 can convert an electric signal obtained by document exposure scanning into a luminance signal having a higher value or a lower value.

The following is example processing for scanning an image on a document.

The scanner unit 13 is configured to enter reflection light, if obtained by exposure scanning an image on a document, to the optical unit 212. The optical unit 212 converts image information into an electric signal. Furthermore, the scanner unit 13 converts an electric signal into luminance signals of R, G, and B colors and outputs the R, G, and B luminance signals as image data to the controller unit 11.

The optical unit 212 can be configured to include a lamp and an optical unit moving relative to a document and charge-coupled devices (CCD) reading exposure light from a document via a condensing lens. Furthermore, the optical unit 212 can be an optical unit including a complementary metal-oxide semiconductor, or can include a contact image sensor (CIS) capable of moving closely along a document to read the document.

Figure 20:
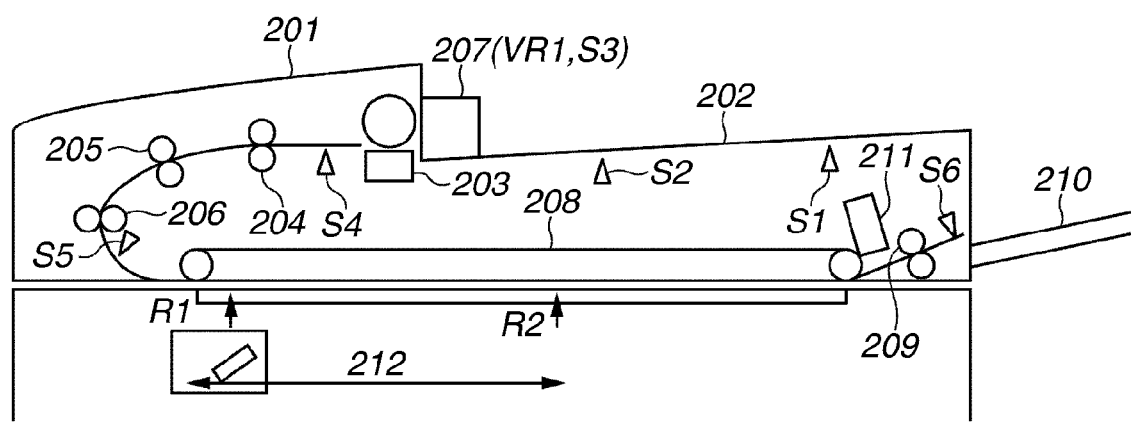
FIG. 20 illustrates a scanner unit of an image forming apparatus.

Document sheets are set on a document tray 202 of the document feeder 201 (FIG. 20). When a user instructs reading of a document via the operation unit 12, the controller unit 11 sends a document reading command to the scanner unit 13. The scanner unit 13 starts separating and conveying a sheet from the document tray 202 of the document feeder 201 in response to the document reading command to perform a document reading operation.

The printer unit 14 is an image forming device capable of forming an image on a sheet based on image data received from the controller unit 11. An image forming method according to an exemplary embodiment is the electrophotographic method using a photosensitive drum or a photosensitive belt, although any other method is usable to form an image. For example, the printer unit 14 can be configured as an inkjet printer that discharges ink droplets from a nozzle array to form an image on a sheet.

The printer unit 14 includes a plurality of sheet cassettes 15, 16, and 17, which respectively store pre-designated sheets different in size. The sheets having been subjected to printing processing are discharged to a discharge tray 18.

FIG. 3 is a block diagram illustrating the controller unit 11 of the image forming apparatus 10. The controller unit 11 is electrically connected to the scanner unit 13 and the printer unit 14. The controller unit 11 is connected, via the LAN 50 or a wide area network (WAN) 331, to the PC 40 and other external apparatus. Thus, the controller unit 11 can input or output image data and device information.

The CPU 301 controls access to various devices based on a control program stored in a read-only memory (ROM) 303, and controls various processing performed in the controller unit 11. A random access memory (RAM) 302 is a system work memory for the CPU 301 and functions as a memory that temporarily stores image data. The RAM 302 includes a static random access memory (SRAM) that can continuously hold data stored therein even after the power source is turned off as well as a dynamic random access memory (DRAM) that deletes the stored data after the power source is turned off. The ROM 303 stores a boot program for the apparatus. A hard disk drive (HDD) 304 can store system software and image data.

An operation unit I/F 305 is an interface unit configured to control data communication between the controller unit 11 and the operation unit 12. The operation unit I/F 305 sends, to the operation unit 12, image data received via a system bus 310. The operation unit 12 displays the image data received from the operation unit I/F 305. The operation unit I/F 305 receives information entered via the operation unit 12 and sends the received information to an appropriate unit via the system bus 310.

A network I/F 306, connected between the LAN 50 and the system bus 310, performs input/output of information. A modem 307, connected between the WAN 331 and the system bus 310, performs input/output of information. A binary image rotating unit 308 converts the orientation of image data to be transmitted. A binary-to-multivalued compression/expansion unit 309 converts the resolution of image data to be transmitted into a predetermined value or a value variable according to a communication partner.

For example, the compression/expansion unit 309 performs Joint Bi-level Image Experts Group (JBIG), Modified Modified Read (MMR), Modified Read (MR), or Modified Huffman (MH) compression/expansion processing on binary image data. An image bus 330, such as Peripheral Components Interconnect (PCI) bus or Institute of Electrical and Electronic Engineers (IEEE) 1394, is a transmission path dedicated to image data.

A scanner image processing unit 312 performs correction, modification, and editing on image data received from the scanner unit 13 via a scanner I/F 311. The scanner image processing unit 312 determines whether the received image data is a color document or a monochromatic document, and determines whether the received image data is a text document or a photo document. The scanner image processing unit 312 associates a determination result with the image data. The associated information is referred to as "attribute data." Example processing performed by the scanner image processing unit 312 is described below.

Figure 4:
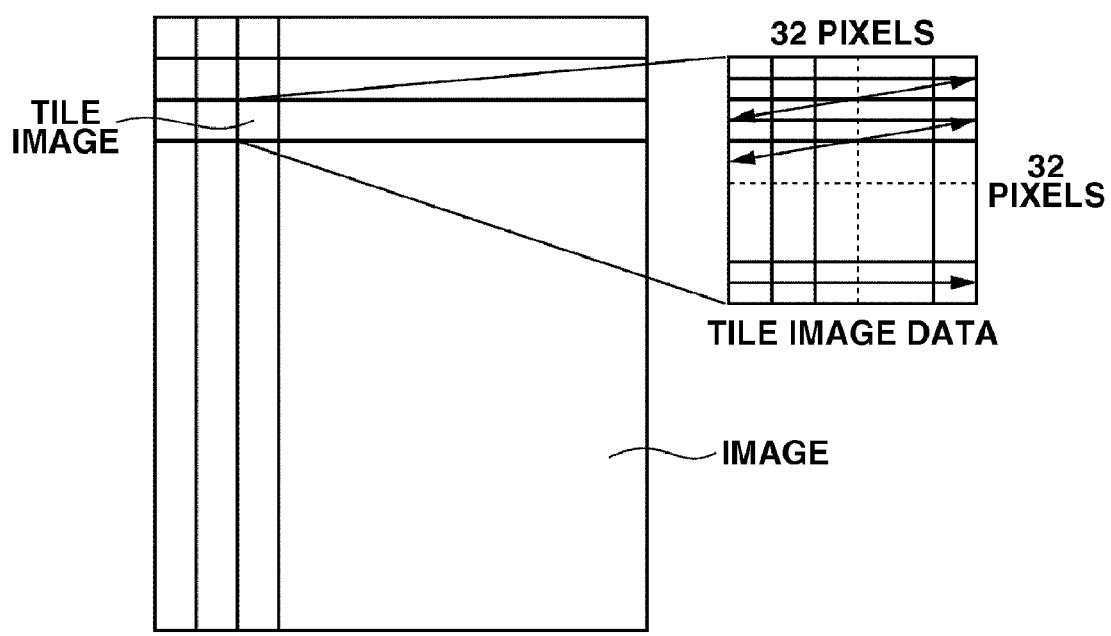
FIG. 4 illustrates example tile data.

A compression unit 313 receives image data and divides the received image data into a plurality of blocks each including 32 pixels×32 pixels. One block of image data including 32×32 pixels is referred to as "tile data", which is illustrated in FIG. 4. A document sheet (i.e., paper medium to be read) includes an area corresponding to the tile data, which can be referred to as "tile image."

The tile data has header information indicating an average luminance value in a block of 32×32 pixels or a coordinate position of the tile image on the document. Furthermore, the compression unit 313 compresses image data including a plurality of tile data. A tile expansion unit 316 expands image data including a plurality of tile data and transmits rasterized image data to a printer image processing unit 315.

The printer image processing unit 315 receives image data from the tile expansion unit 316 and performs image processing on the image data with reference to attribute data attached to the image data. The image data having been subjected to the image processing is output, via a printer I/F 314, to the printer unit 14. Example processing performed by the printer image processing unit 315 is described below.

An image conversion unit 317 performs predetermined conversion processing on image data. The image conversion unit 317 includes the following processing units.

An expansion unit 318 expands received image data. A compression unit 319 compresses received image data. A rotating unit 320 rotates received image data. A zooming unit 321 performs resolution conversion processing (e.g., conversion from 600 dpi to 200 dpi) on received image data. A color space conversion unit 322 converts a color space of received image data.

For example, the color space conversion unit 322 performs conventionally known processing, such as background color removal processing using a matrix or a table, LOG conversion processing (RGB→CMY), or output color correction processing (CMY→CMYK). A binary-to-multivalued conversion unit 323 converts received image data having two gradation levels into image data having 256 gradation levels. On the contrary, a multivalued-to-binary conversion unit 324 converts received image data having 256 gradation levels into image data having two gradation levels, for example, by using error diffusion processing.

A combining unit 327 combines two received image data to generate one image data. For example, when two image data are combined, the combining unit 327 calculates an average luminance value of pixels (objects to be combined) to determine a combined luminance value. Alternatively, the combining unit 327 can designate a luminance value of a brighter (or darker) pixel as a combined luminance value. Furthermore, the combining unit 327 can apply OR calculation, AND calculation, or exclusive-OR calculation to pixels (objects to be combined) to determine a combined luminance value.

A thinning unit 326 performs resolution conversion by thinning out some of pixels included in received image data and generates image data having a reduced size of ½, ¼, or ⅛. A moving unit 325 adds or removes a margin to or from received image data.

A raster image processor (RIP) 328 receives intermediate data generated based on page description language (PDL) code data, which is transmitted from, for example, the PC 40, and generates bitmap data (multivalued data).

Figure 5:
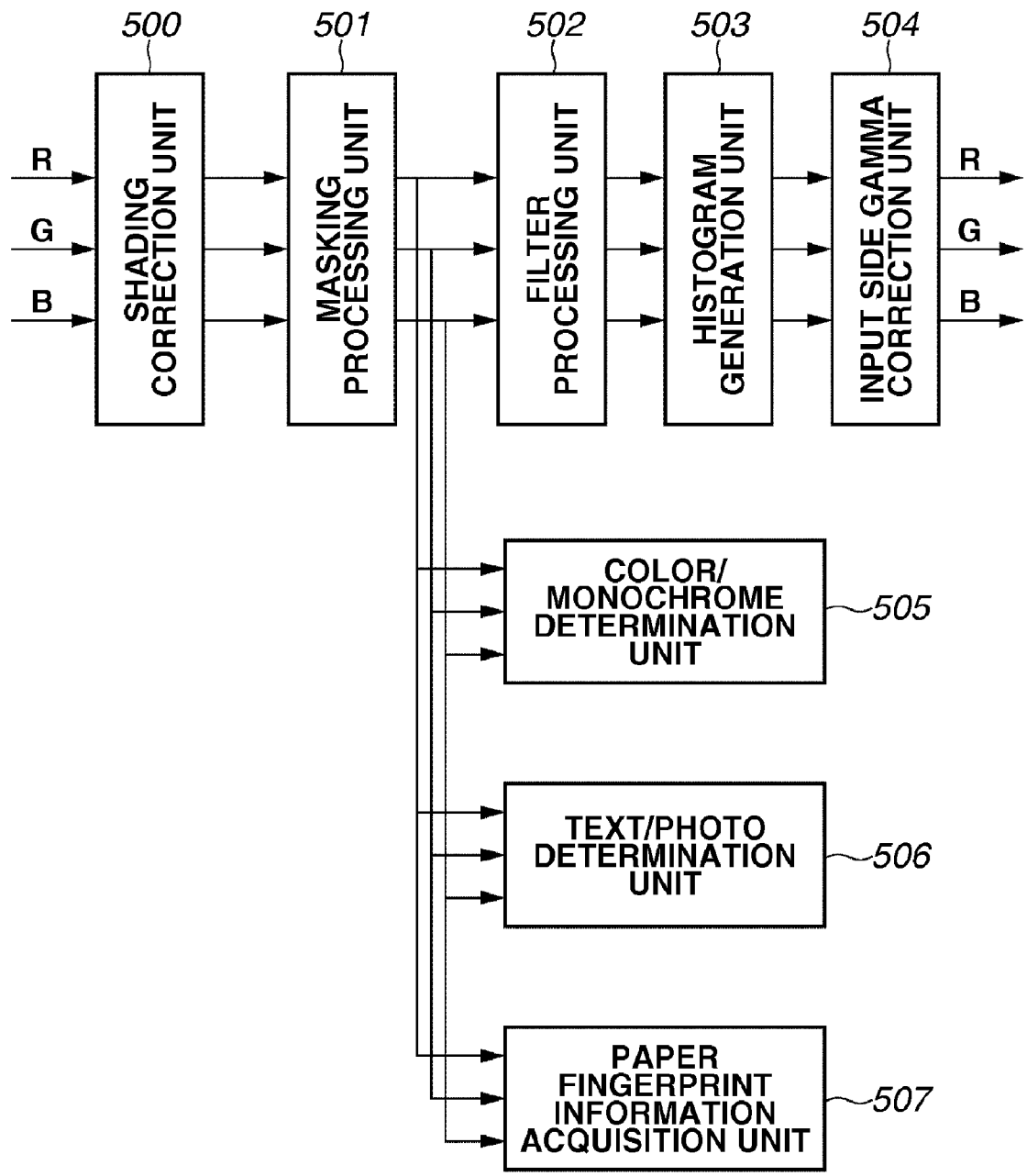
FIG. 5 illustrates a scanner image processing unit of the controller unit.

FIG. 5 illustrates an example configuration of the scanner image processing unit 312.

The scanner image processing unit 312 receives, as image data, 8-bit luminance signals of R, G, and B colors.

The shading correction unit 500 performs shading corrects on respective luminance signals. The shading correction is processing for preventing the brightness of a document from being erroneously recognized depending on differences of an optical unit in sensitivity, as described above.

Furthermore, as described above, the shading correction unit 500 can perform gain adjustment according to an instruction received from the CPU 301.

A masking processing unit 501 converts luminance signals into standard luminance signals, which are independent from the filter colors of the optical unit.

A filter processing unit 502 corrects spatial frequency of received image data. The filter processing unit 502 performs calculation processing, for example, using a 7×7 matrix on received image data. The operation unit 12, i.e., an user interface (UI) of the image forming apparatus 10, enables a user to set a copy mode selected from text mode, photo mode, and text/photo mode.

If a user selects the text mode, the filter processing unit 502 applies a text filter to the entire image data. If a user selects the photo mode, the filter processing unit 502 applies a photo filter to the entire image data. If a user selects the text/photo mode, the filter processing unit 502 adaptively switches the filters for each pixel according to a below-described text/photo determination signal (part of attribute data).

More specifically, the filter processing unit 502 determines a filter to be used for each pixel, which is selectable from the photo filter and the text filter. The photo filter includes coefficients effective to smooth only high-frequency components. Thus, the photo filter can suppress roughness of an image. The text filter includes coefficients effective for edge enhancement. Thus, the text filter can enhance sharpness of text.

A histogram generation unit 503 samples luminance data of each pixel of received image data. More specifically, the histogram generation unit 503 performs sampling at constant pitches in both main and sub scanning directions, to obtain luminance data in a rectangular area defined by a start point to an end point in each of the main and sub scanning directions.

Then, the histogram generation unit 503 generates histogram data based on sampling results. The generated histogram data is usable to estimate a background level for the background color removal processing. An input side gamma correction unit 504 includes tables to convert input signals into luminance data having nonlinear characteristics.

A color/monochrome determination unit 505 determines whether each pixel of received image data is chromatic color or achromatic color, and attaches a color/monochrome determination signal representing a determination result (part of attribute data) to image data.

A text/photo determination unit 506 determines whether each pixel of image data is a text pixel, a halftone dot pixel, a text pixel in a halftone dot image, or a pixel in a solid image, based on the pixel value of each pixel and pixel values of neighboring pixels surrounding each pixel. If a pixel is not agreeable with any one of the above-described pixels, the text/photo determination unit 506 regards the pixel as a white area pixel. The text/photo determination unit 506 attaches a determination result as a text/photo determination signal (part of attribute data) to image data.

A paper fingerprint information acquisition unit 507 selects an appropriate paper fingerprint information acquisition area from the RGB image data input from the shading correction unit 500, and acquires paper fingerprint data from the determined paper fingerprint information acquisition area. An example method for selecting an appropriate area and acquiring paper fingerprint information is described below.

Figure 6:
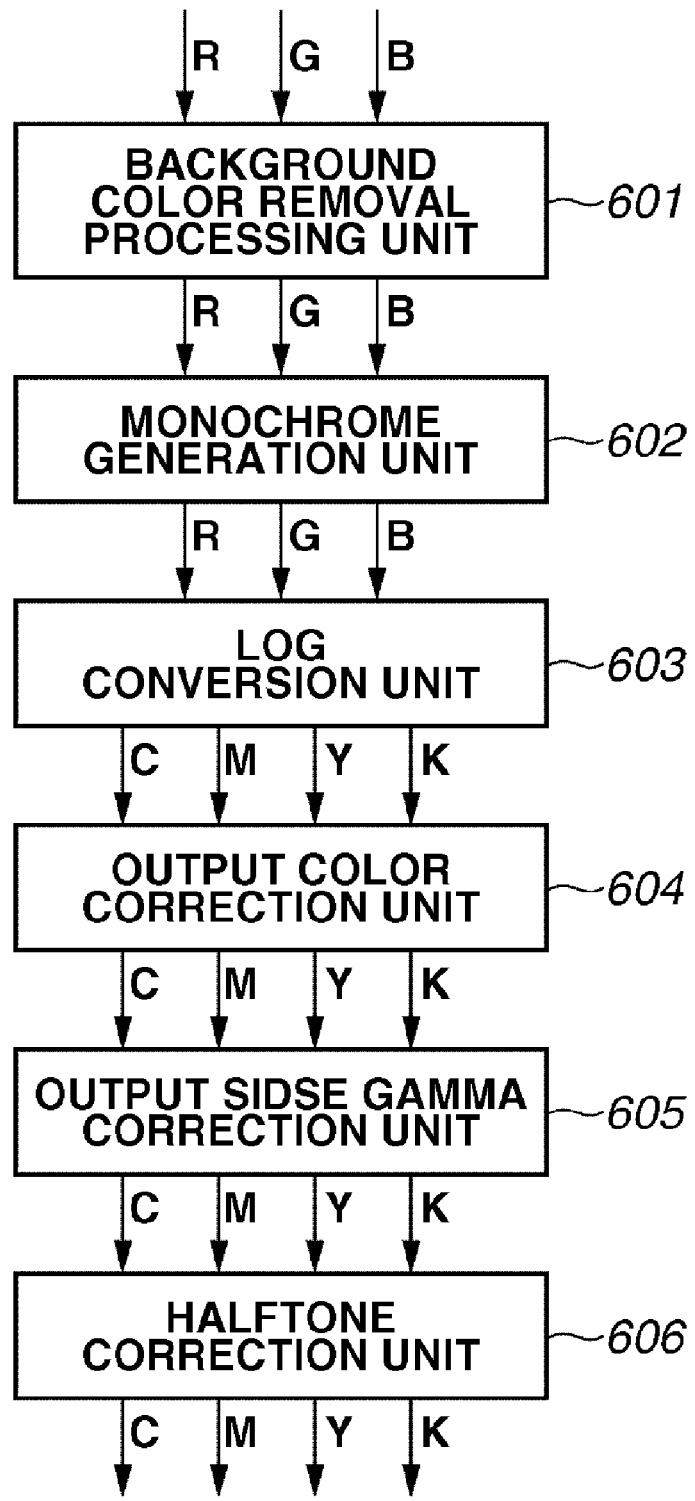
FIG. 6 illustrates an example flow of printer image processing performed by the controller unit.

FIG. 6 illustrates example processing performed by the printer image processing unit 315.

A background color removal processing unit 601 removes background color of image data using the histogram generated by the scanner image processing unit 312. A monochrome generation unit 602 converts color data into monochromatic data. A log conversion unit 603 performs luminance density conversion. For example, the log conversion unit 603 converts RGB input image data into CMY image data. An output color correction unit 604 performs output color correction. For example, the output color correction unit 604 converts the CMY input image data into CMYK image data using a table or a matrix.

An output side gamma correction unit 605 performs correction on an input signal so that the input signal is proportional to a copy output reflection density value. A halftone correction unit 606 performs halftone processing according to the number of gradation levels of an output printer unit. For example, the halftone correction unit 606 performs binary or 32-valued processing on input higher-gradation image data.

The scanner image processing unit 312 and the printer image processing unit 315 can directly output received image data without performing any processing on the image data.

Figure 7:
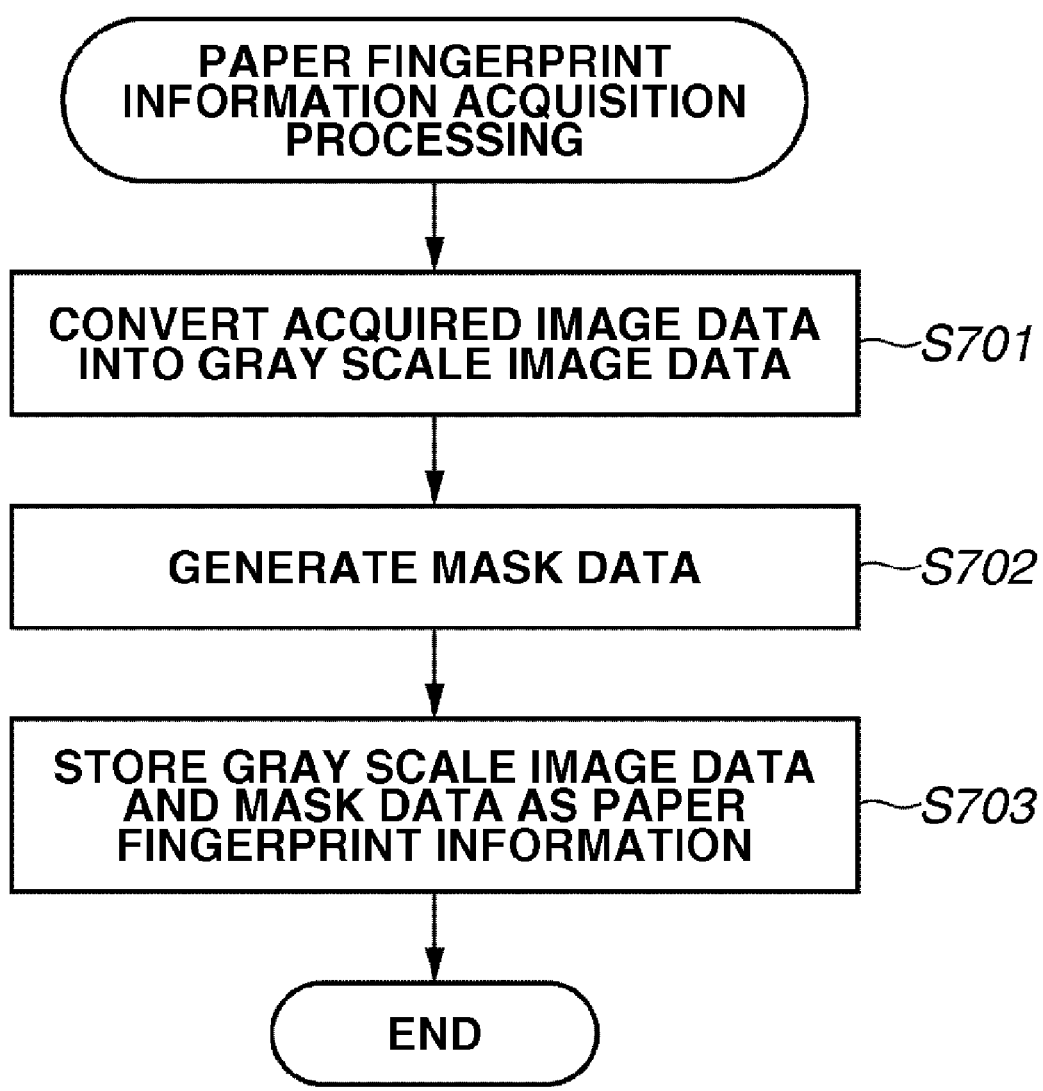
FIG. 7 is a flowchart illustrating example paper fingerprint information acquisition processing performed by a paper fingerprint information acquisition unit of the scanner image processing unit.

FIG. 7 is a flowchart illustrating paper fingerprint information acquisition processing performed by the paper fingerprint information acquisition unit 507. In step S701, the CPU 301 converts image data acquired by the paper fingerprint information acquisition unit 507 into gray scale image data. In step S702, the CPU 301 generates mask data used for collation, after removing printed or handwritten text that may cause erroneous determination from the image converted into gray scale image data in step S701. The mask data is binary data of "0" or "1."

In gray scale image data, any pixel having a luminance signal value equal to or greater than a first threshold (namely, bright) has a mask data value set to "1." Any pixel having a luminance signal value less than the first threshold has a mask data value set to "0." The CPU 301 performs the above-described processing for each pixel included in the gray scale image data.

In step S703, the CPU 301 stores two types of acquired data, i.e., the gray scale image data converted in step S701 and mask data generated in step S702, as paper fingerprint information. Although the gray scale image data converted in step S701 is usable as paper fingerprint information, an exemplary embodiment refers to the above-described two types of data as paper fingerprint information (paper fingerprint data).

The paper fingerprint information acquisition unit 507 transmits paper fingerprint information in the above-described paper fingerprint information acquisition area to the RAM 302 via a data bus (not illustrated).

To realize paper fingerprint information registration processing, the CPU 301 reads a predetermined area of paper fingerprint information transmitted from the paper fingerprint information acquisition unit 507 to the RAM 302. Then, the CPU 301 registers the readout information to a server (not illustrated). When registration of the paper fingerprint information in the server is successful, the operation unit 12 displays an authenticity management number. A user can input a management number in the paper fingerprint collation processing. The CPU 301 can execute a program stored in the RAM 302 to realize the above-described sequential registration processing.

To realize paper fingerprint information collation processing, the CPU 301 reads paper fingerprint information from a document to be collated, which is stored from the paper fingerprint information acquisition unit 507 to the RAM 302.

Then, the CPU 301 collates the readout paper fingerprint information with other paper fingerprint information whose authenticity is registered beforehand.

In an exemplary embodiment, the paper fingerprint information whose authenticity is registered beforehand is paper fingerprint information registered in a server. A user can collate authenticity by inputting a management number, although the collation performed between the CPU 301 and a server is not limited to a specific method. For example, if a document feeder can add a unique identification (ID) to a document in the paper fingerprint information registration processing, the document feeder can register the ID attached to a document as an authentic original document in the collation processing.

Figure 8:
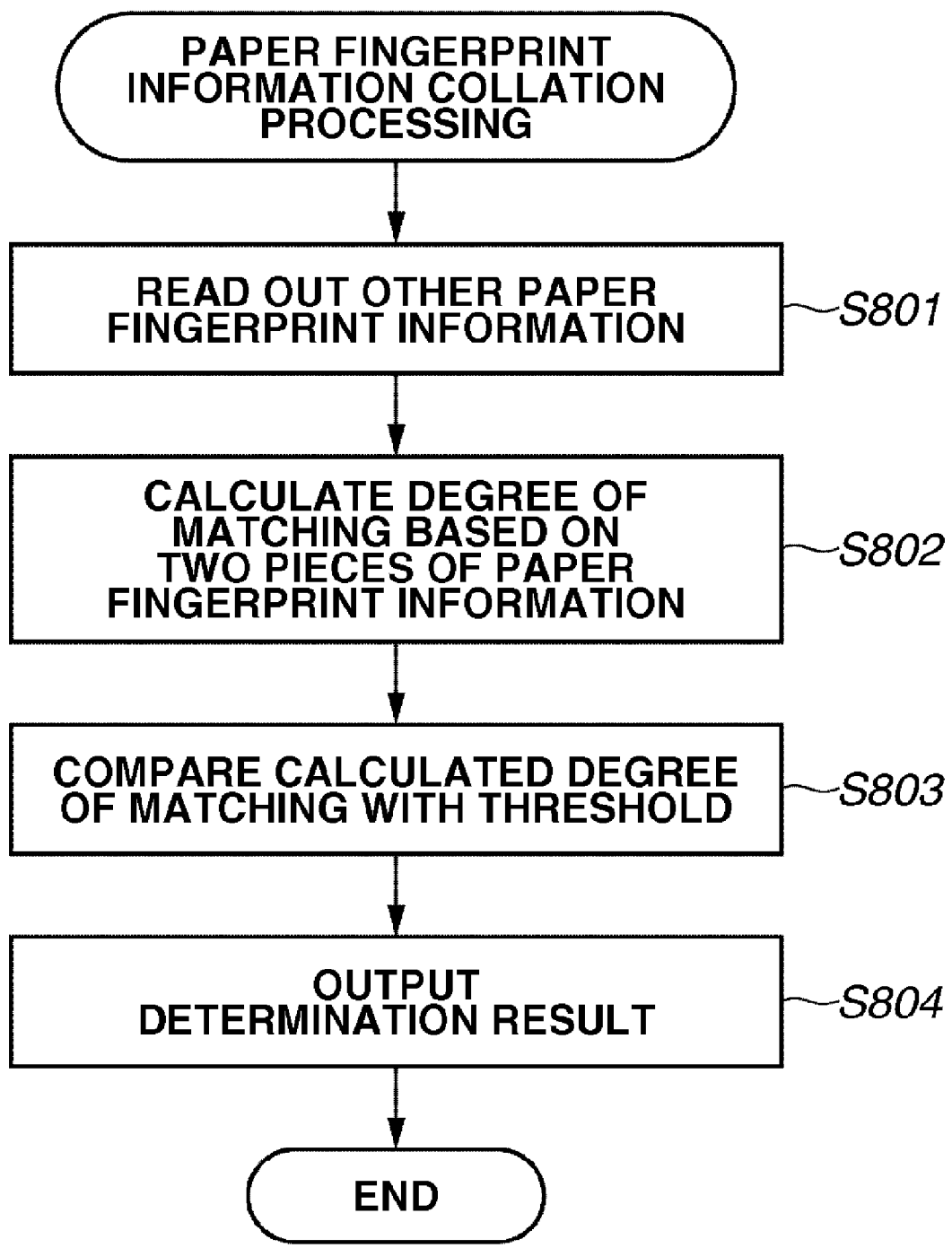
FIG. 8 is a flowchart illustrating example paper fingerprint information collation processing.

FIG. 8 is a flowchart illustrating example paper fingerprint information collation processing. The CPU 301 executes processing in each step of the flowchart.

In step S801, the CPU 301 reads out and acquires, from the RAM 302, paper fingerprint information registered in a server.

$$E(i, j) = \frac{\sum_{x,y} \alpha_1(x, y)\alpha_2(x-i, y-j)\{f_1(x, y) - f_2(x-i, y-j)\}^2}{\sum_{x,y} \alpha_1(x, y)\alpha_2(x-i, y-j)} \quad (1)$$

In the above-described formula (1), $\alpha_1$ represents mask data included in the (registered) paper fingerprint information read out in step S801. $f_1$ represents gray scale image data included in the (registered) paper fingerprint information read out in step S801. $\alpha_2$ represents mask data included in the (newly acquired) paper fingerprint information transmitted from the paper fingerprint information acquisition unit 507 in step S802. $f_2$ represents gray scale image data included in the (newly acquired) paper fingerprint information transmitted from the paper fingerprint information acquisition unit 507 in step S802.

An example method is described below with reference to FIGS. 9, 10, 11, and 12. FIG. 9 illustrates an image of the registered paper fingerprint information and an image of the newly acquired paper fingerprint information. Each image includes n pixels in the horizontal direction and m pixels in the vertical direction.

The CPU 301 obtains (2n−1)×(2m−1) error values E(i, j), i.e., E(−n+1,−m+1) to E(n−1,m−1), between two images of registered paper fingerprint information and newly acquired paper fingerprint information according to formula (1), by shifting i by one pixel in the range of −n+1 to n−1 and also shifting j by one pixel in the range of −m+1 to m−1.

Figure 10:
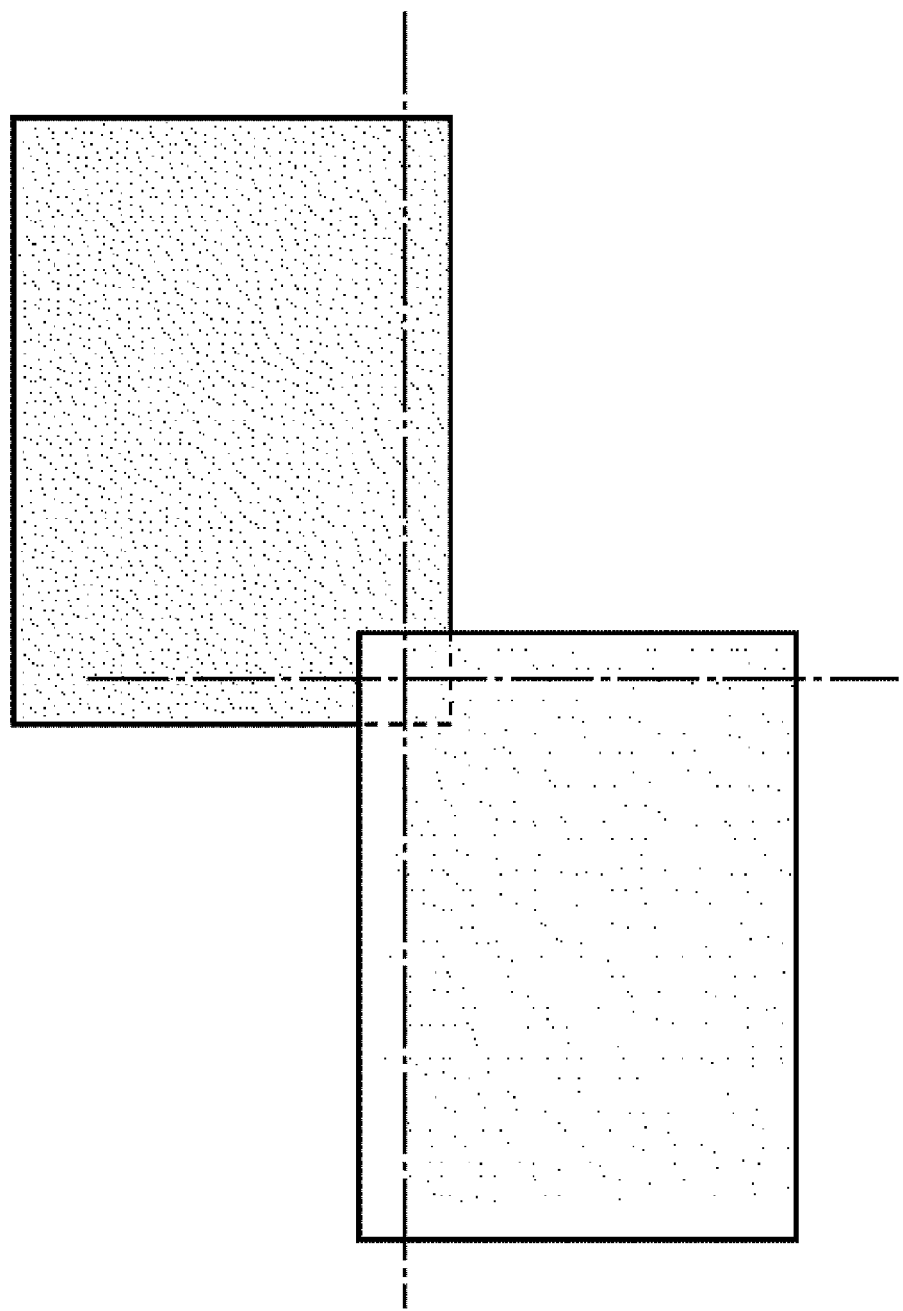
FIG. 10 illustrates how to obtain E1×1.

FIG. 10 illustrates an image of the newly acquired paper fingerprint information whose lower right pixel is overlapped with an upper left pixel of an image of the registered paper fingerprint information. The CPU 301 obtains E(−n+1,−m+1) as a value derived from formula (1) in this state.

Figure 11:
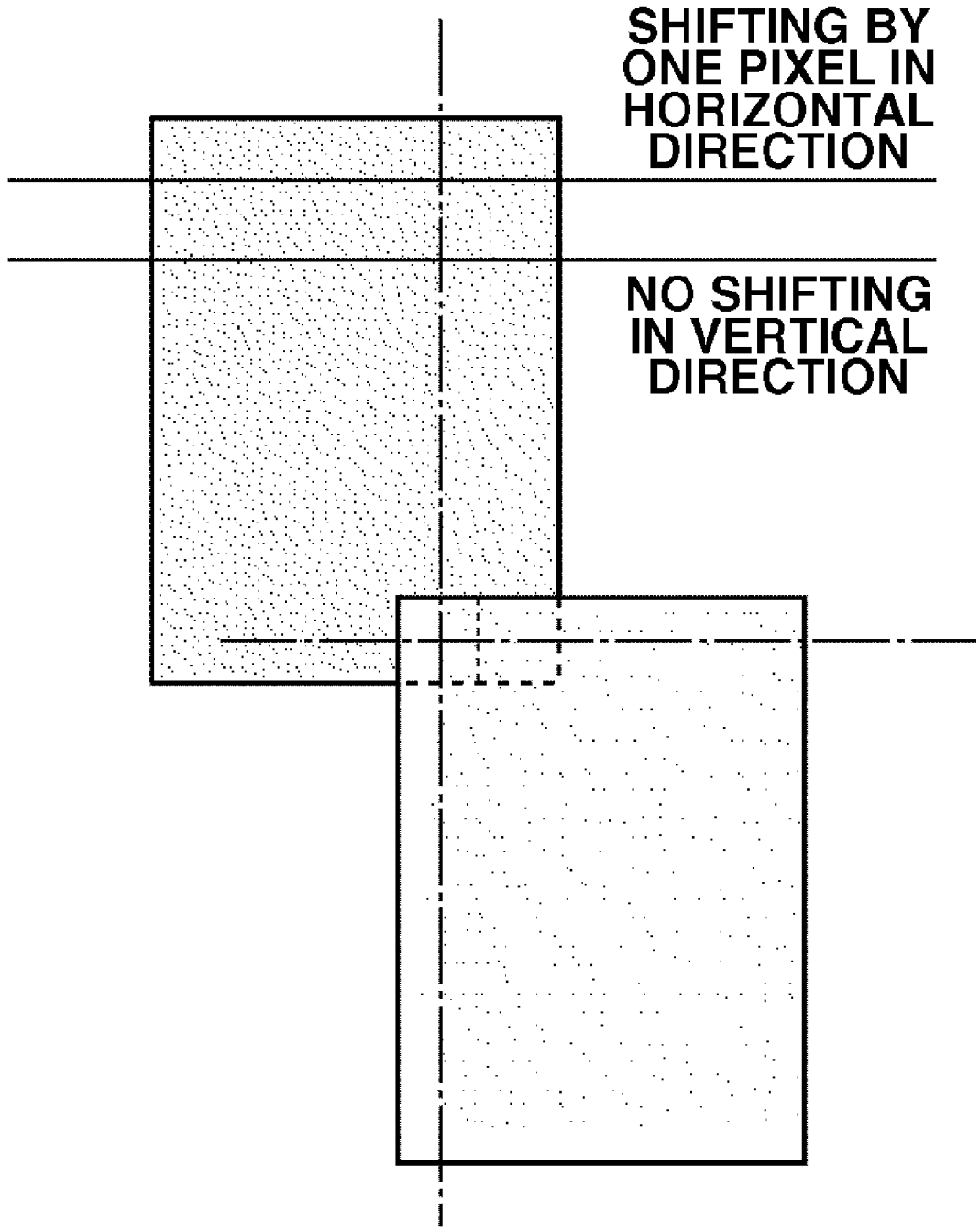
FIG. 11 illustrates how to obtain E2×1.

FIG. 11 illustrates an image of the newly acquired paper fingerprint information moved rightward by one pixel relative to the image of the registered paper fingerprint information illustrated in FIG. 10. The CPU 301 obtains E(−n+2,−m+1) as a value derived from formula (1) in this state. The CPU 301 performs similar calculation by moving the image of the newly acquired paper fingerprint information.

Figure 12:
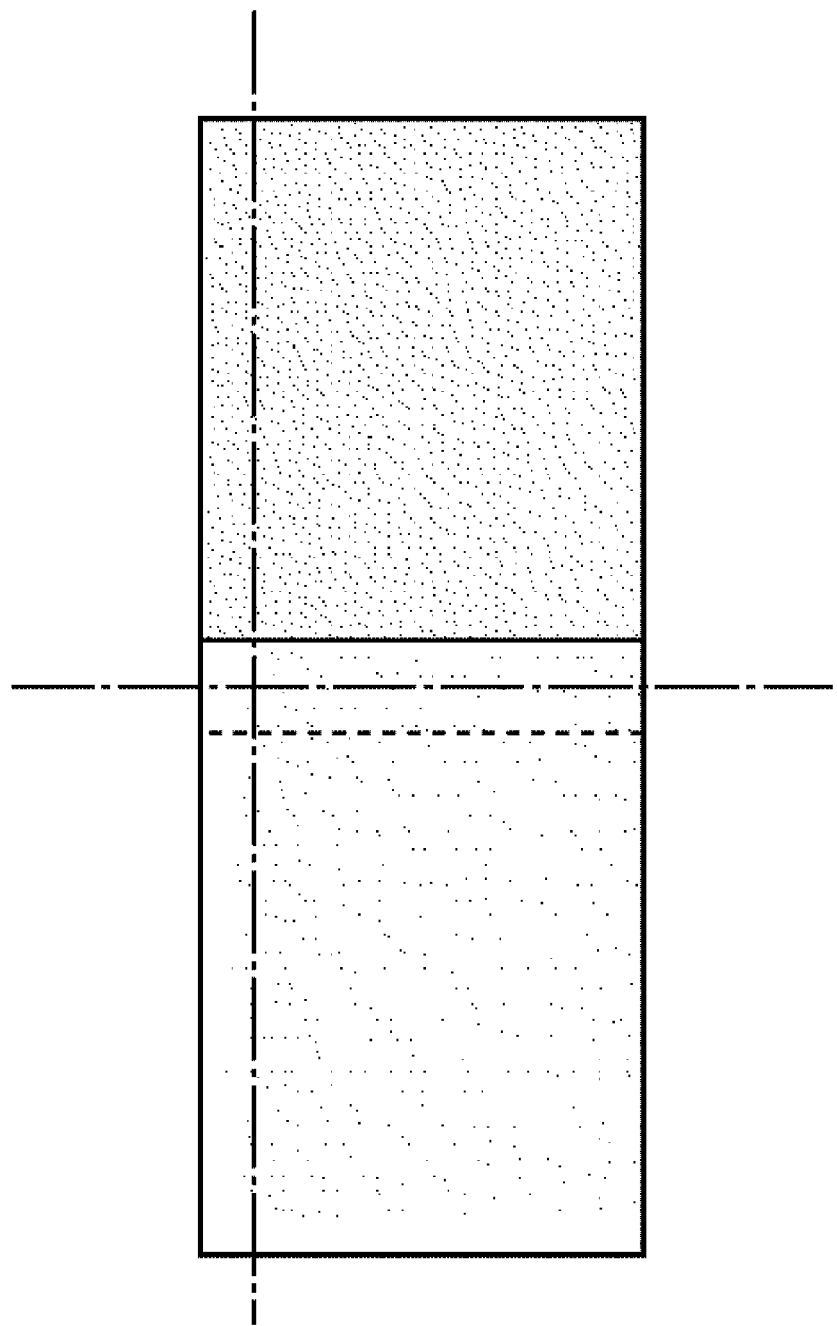
FIG. 12 illustrates how to obtain En×1.

FIG. 12 illustrates an image of the newly acquired paper fingerprint information completely overlapped with the image of the registered paper fingerprint information in the horizontal direction. The CPU 301 obtains E(0,−(m−1)) as a value derived from formula (1) in this state.

Figure 13:
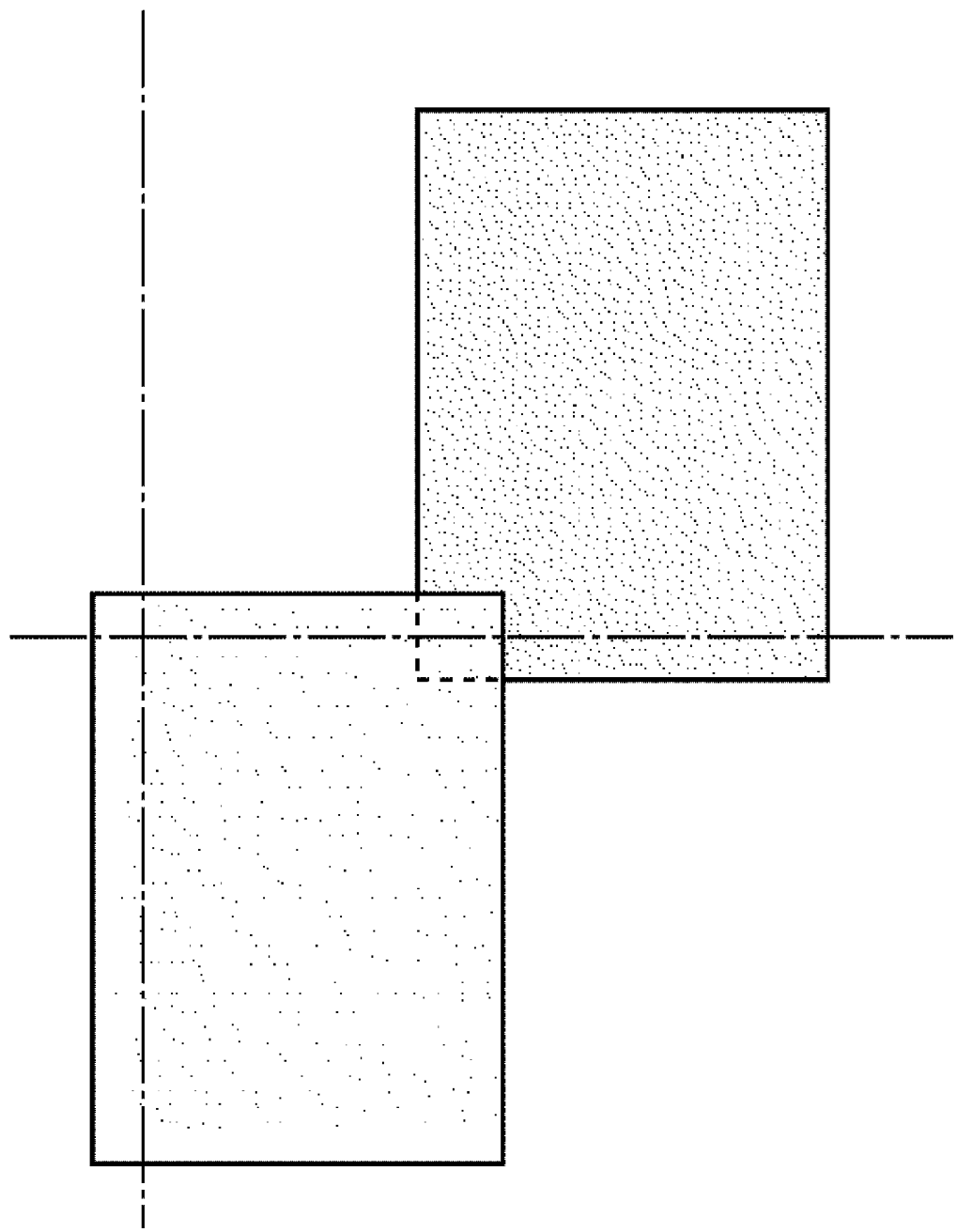
FIG. 13 illustrates how to obtain E2n−1×1.

Furthermore, FIG. 13 illustrates an image of the newly acquired paper fingerprint information whose lower left pixel is overlapped with an upper right pixel of the image of the registered paper fingerprint information. The CPU 301 obtains E(n−1,−m+1) as a value derived from formula (1) in this state. In this manner, the CPU 301 obtains E(i, j) by successively incrementing i by 1 (i.e., by shifting the newly acquired paper fingerprint information in the horizontal direction relative to the registered paper fingerprint information).

Figure 14:
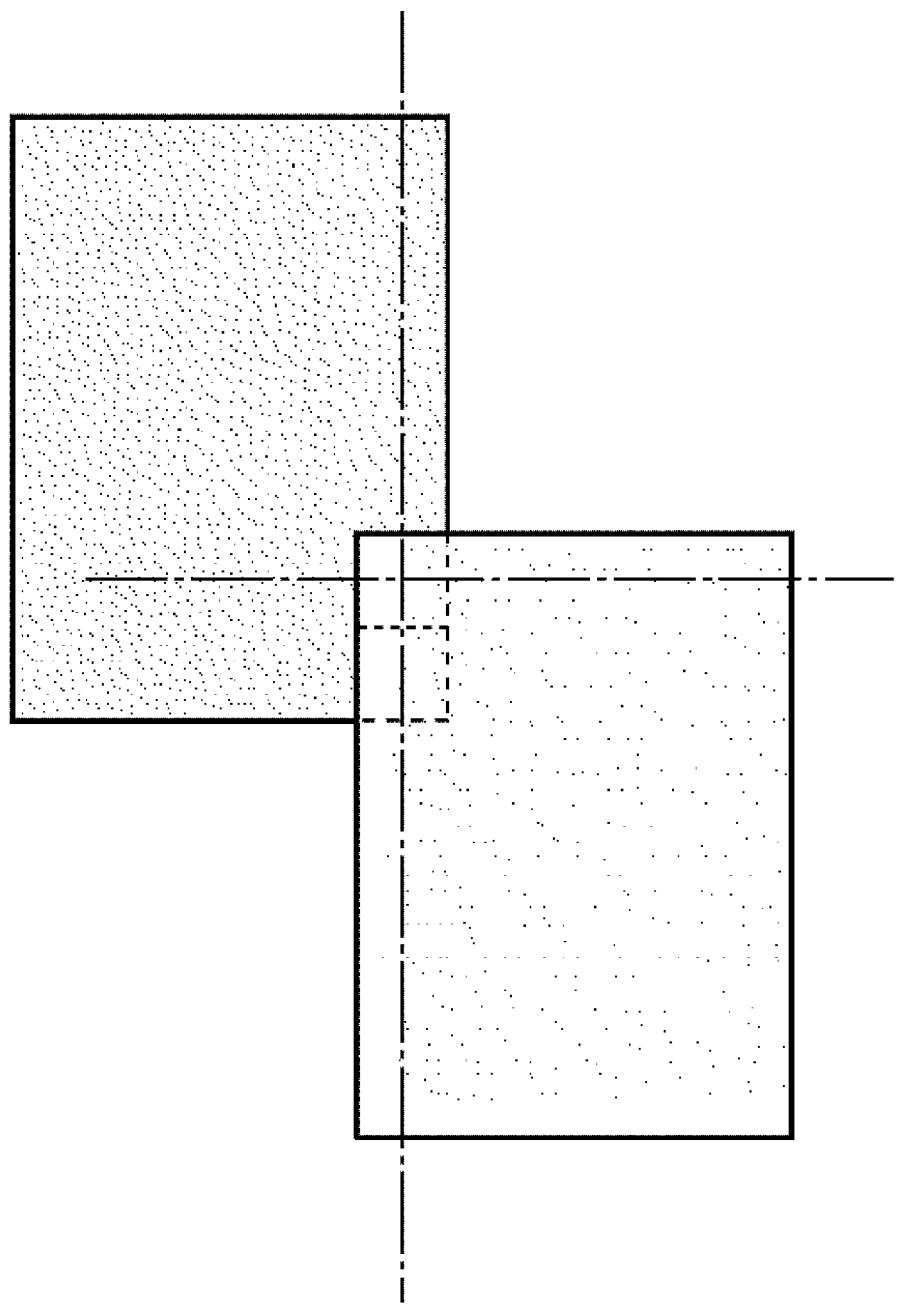
FIG. 14 illustrates how to obtain E1×2.

FIG. 14 illustrates an image of the newly acquired paper fingerprint information moved downward (i.e., in the vertical direction) by one pixel relative to the image of the registered paper fingerprint information illustrated in FIG. 10. The CPU 301 obtains E(−n+1,−m+2) as a value derived from formula (1) in this state.

Figure 15:
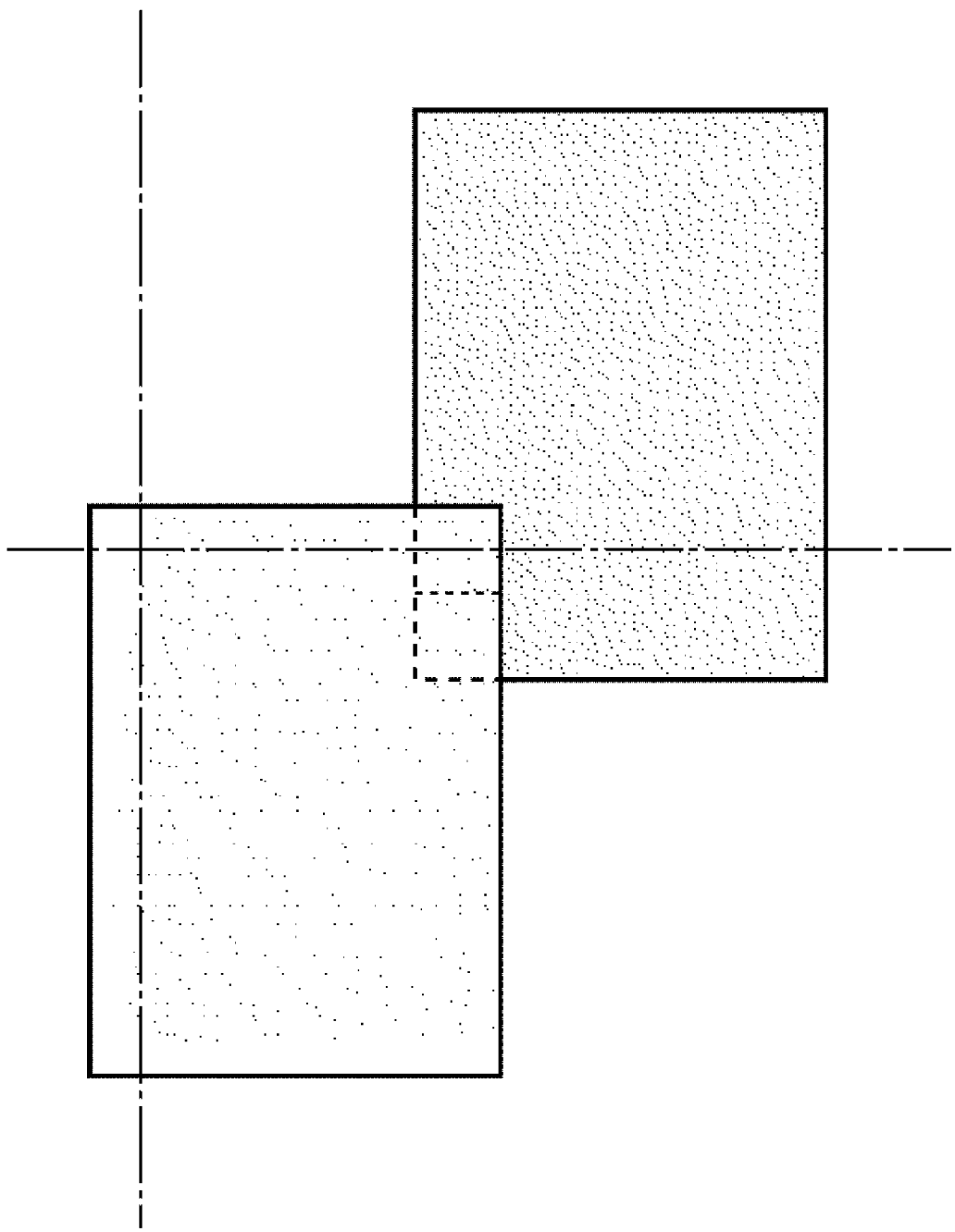
FIG. 15 illustrates how to obtain E2n−1×2.

FIG. 15 illustrates an image of the newly acquired paper fingerprint information moved to the rightmost end from the state illustrated in FIG. 14. The CPU 301 obtains E(n−1,−m+2) as a value derived from formula (1) in this state.

Figure 16:
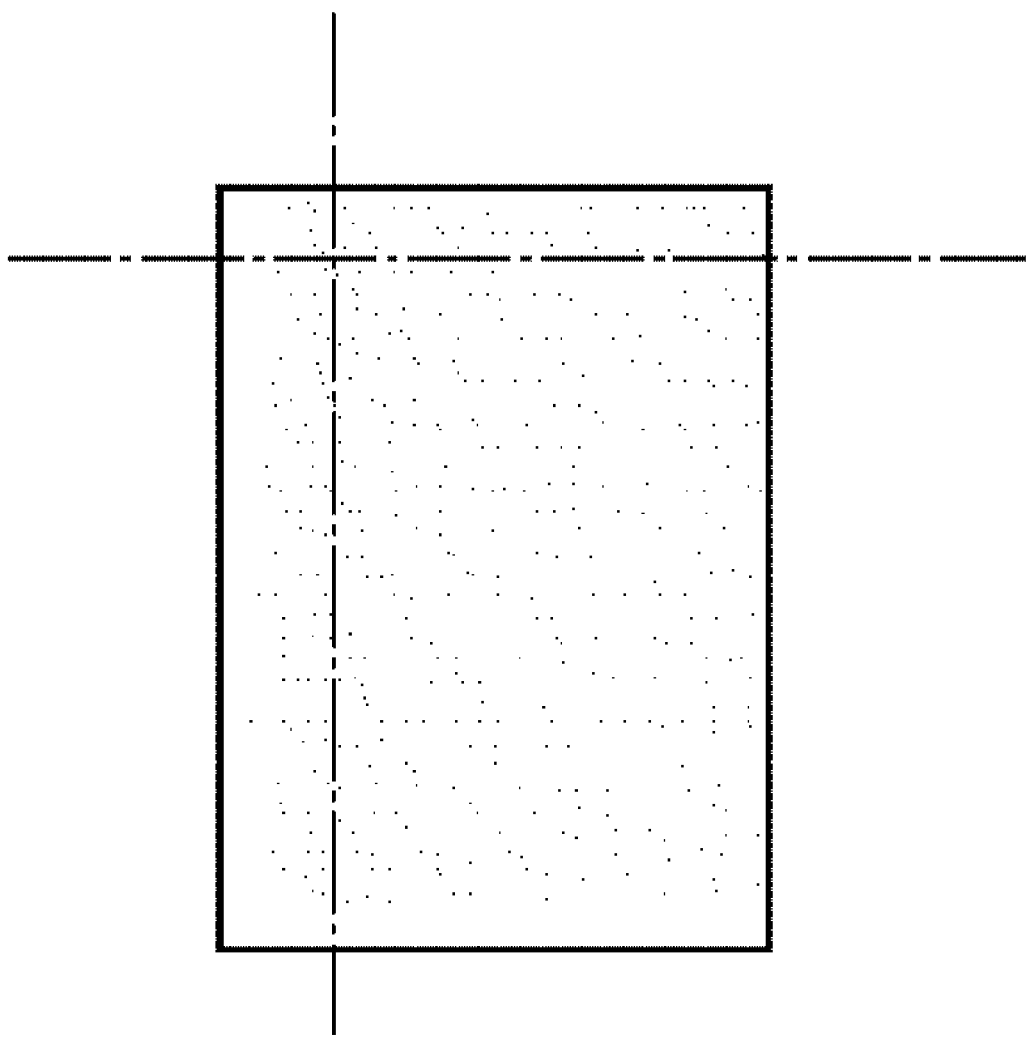
FIG. 16 illustrates how to obtain En×m.

FIG. 16 illustrates an image of the newly acquired paper fingerprint information completely overlapped with the image of the registered paper fingerprint information in both the horizontal direction and the vertical direction. The CPU 301 obtains E(0, 0) as a value derived from formula (1) in this state.

Figure 17:
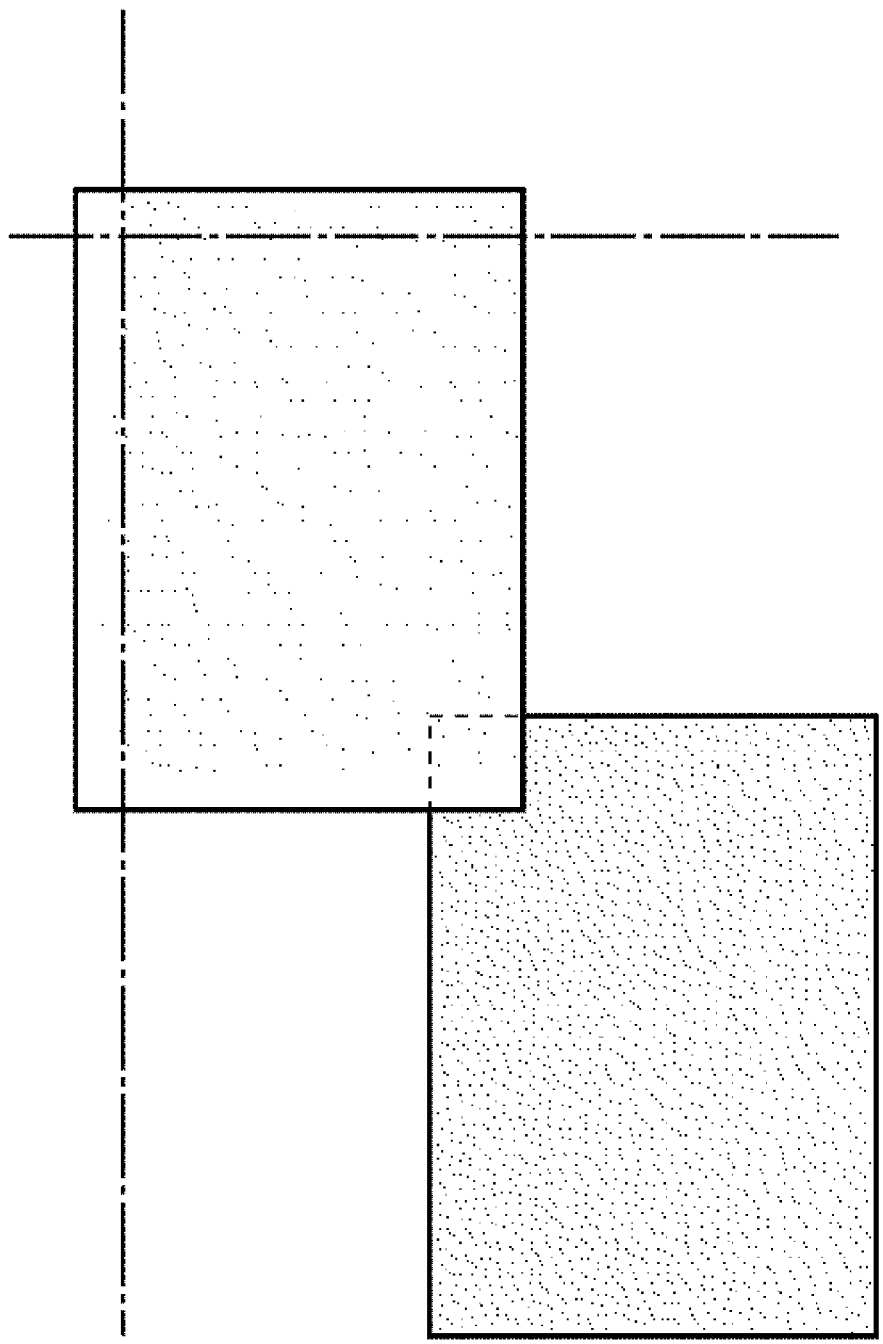
FIG. 17 illustrates how to obtain E2n−1×2m−1.

The CPU 301 performs similar calculation by shifting the image of the newly acquired paper fingerprint information relative to the image of the registered paper fingerprint information so that at least one pixel is overlapped between two images. Finally, the CPU 301 obtains E(n−1,m−1) in a state illustrated in FIG. 17.

In this manner, the CPU 301 obtains a set of (2n−1)×(2m−1) error values E(i, j).

To consider the meaning of formula (1), it is now assumed that i=0, j=0, $\alpha_1$(x, y)=1 (x=0 to n and y=0 to m), and $\alpha_2$(x−i, y−j)=1 (x=0 to n and y=0 to m). Namely, the CPU 301 obtains E(0, 0) corresponding to the conditions of $\alpha_1$(x, y)=1 (x=0 to n and y=0 to m) and $\alpha_2$(x−i, y−j)=1 (x=0 to n and y=0 to m).

The state illustrated in FIG. 16 satisfies the conditions i=0 and j=0, where the image of the newly acquired paper fingerprint information is completely overlapped with the image of the registered paper fingerprint information in both the horizontal direction and the vertical direction.

The condition $\alpha_1$(x, y)=1 (x=0 to n and y=0 to m) indicates that all pixels constituting the image of the registered paper fingerprint information are bright. In other words, $\alpha_1$(x, y)=1 indicates that a paper fingerprint acquisition area is not spoiled by coloring material (toner, ink, etc.) or dust when the registered paper fingerprint information is acquired.

The condition $\alpha_2$(x−i, y−j)=1 (x=0 to n and y=0 to m) indicates that all pixels constituting the image of the newly acquired paper fingerprint information are bright. In other words, $\alpha_2$(x−i, y−j)=1 indicates that a paper fingerprint acquisition area is not spoiled by coloring material (toner, ink, etc.) or dust when the present paper fingerprint information is acquired.

If the conditions $\alpha_1$(x, y)=1 and $\alpha_2$(x−i, y−j)=1 are satisfied for all pixels, formula (1) can be expressed in the following manner.

$$E(0, 0) = \sum_{x=0, y=0}^{n,m} \{f_1(x, y) - f_2(x, y)\}^2$$

$\{f_1(x, y)-f_2(x, y)\}^2$ is a square value of the difference between gray scale image data included in the registered paper fingerprint information and gray scale image data included in the newly acquired paper fingerprint information. Accordingly, formula (1) is a sum of square values of the difference between corresponding pixels in two pieces of paper fingerprint information. In other words, if there are many pixels whose $f_1$(x, y) and $f_2$(x, y) values are similar, the value E(0, 0) becomes smaller.

Similar to the above-described calculation of E(0, 0), the CPU 301 obtains other E(i, j) values. From the relationship that the value E(i, j) becomes smaller if there are many pixels whose $f_1$(x, y) and $f_2$(x, y) values are similar, it is understood if the condition E(k, l)=min{E(i, j)} is satisfied that the position where the registered paper fingerprint information is acquired and the position where the new paper fingerprint information is acquired are mutually deviated by the amounts of k and l.

The numerator of formula (1) indicates a result obtained by multiplying $\{f_1(x, y)-f_2(x-i, y-j)\}^2$ by $\alpha_1$ and $\alpha_2$ (more specifically, symbol "Σ" indicates obtaining a sum value) Regarding $\alpha_1$ and $\alpha_2$ values, a dark color pixel is 0 and a light color pixel is 1.

Accordingly, when either one (or both) of $\alpha_1$ and $\alpha_2$ is 0, the value $\alpha_1\alpha_2\{f_1(x, y)-f_2(x-i, y-j)\}^2$ becomes 0.

Namely, if the object pixel is dark color in either one (or both) of two pieces of paper fingerprint information, density difference in this pixel is not taken into consideration. In other words, any pixel can be disregarded if spoiled by dust or coloring material.

The above-described processing increases or decreases the sum value expressed by symbol "Σ." Therefore, formula (1) includes a denominator representing the total number $\Sigma\alpha_1$(x, y)$\alpha_2$(x−i, y−j) to perform normalization. Any error value E (i, j), if its $\Sigma\alpha_1$(x, y)$\alpha_2$(x−i, y−j) value becomes 0, is excluded from the below-described set of error values (E(−(n−1), −(m−1)) to E(n−1, m−1)).

As described above, it is understood if the condition E(k, l)=min{E(i, j)} is satisfied that the position where the registered paper fingerprint information is acquired and the position where the new paper fingerprint information is acquired are mutually deviated by the amounts of k and l.

Subsequently, the CPU 301 obtains a value indicating similarity between two pieces of paper fingerprint information (hereinafter, referred to as "degree of matching") based on E (k, l) and other E(i, j).

First, the CPU 301 obtains an average value (40) from the set of error values derived from the formula (1) (e.g., E(0, 0)=10*, E(0, 1)=50, E(1, 0)=50, and E(1, 1)=50). (A)

In this case, 10* is not relevant to a numerical value, as described below.

Next, the CPU 301 obtains a new set of values (30*, −10, −10, −10) by subtracting error values (10*, 50, 50, 50) from the average value (40). (B)

Then, the CPU 301 obtains standard deviations (30×30+ 10×10+10×10+10×10=1200, 1200/4=300, and √300=10√3= approximately 17) from the new set of values. Then, the CPU 301 obtains quotient (1*, −1, −1, −1) by dividing the new set of values by 17. (C)

Then, the CPU 301 regards the obtained maximum value as "degree of matching (1*)." The value 1* is a value corresponding to E(0, 0)=10*. E(0, 0) is a value satisfying E(0, 0)=min{E(i, j)} in this case.

The processing for determining the above-described "degree of matching" is, thus, equivalent to calculating how the smallest error value in a set of a plurality of error values is distant from the average error value. (A and B)

Then, the CPU 301 obtains a degree of matching by dividing the distance by the standard deviation. (C)

Finally, the CPU 301 obtains a result of collation by comparing the degree of matching with a threshold. (D)

The standard deviation is an average value of "the difference between each error value and the average value." In other words, the standard deviation is a value indicating the degree of entire deviation in the set of values.

Thus, by dividing the above-described distance by the entire deviation, the CPU 301 can evaluate smallness of min{E(i, j)} in the set of E(i, j), namely the CPU 301 can determine whether min{E(i, j)} is extremely small or slightly small.

If min{E(i, j)} is extremely small in the set of E(i, j), the CPU 301 determines that min{E(i, j)} is valid. Otherwise, the CPU 301 determines that min{E (i, j)} is invalid. (D)

It is now assumed that the registered paper fingerprint information and the newly acquired paper fingerprint information are originated from the same paper.

In this case, the registered paper fingerprint information and the newly acquired paper fingerprint information are quite similar with each other at least at one portion (deviation position). In this case, the value E(i, j) becomes very smaller at the deviation position where the registered paper fingerprint information and the newly acquired paper fingerprint information are quite similar with each other.

On the other hand, if the position shifts from the deviation position, the registered paper fingerprint information and the newly acquired paper fingerprint information have no relevancy. Accordingly, E(i, j) becomes a larger value (ordinary value).

Therefore, a condition "two pieces of paper fingerprint information are acquired from the same paper" accords with a condition "smallest E(i, j) is extremely small in the set of E(i, j)."

Referring back to the paper fingerprint information collation processing illustrated in FIG. 8, in step S803, the CPU 301 compares the degree of matching between two pieces of paper fingerprint information obtained in step S802 with a predetermined threshold, and determines a comparison result "valid" or "invalid." The degree of matching can be referred to as "similarity." The result of a comparison between the degree of matching and the predetermined threshold can be referred to as "result of collation." After step S803, the processing proceeds to step S804. In step S804, the CPU 301 outputs the determination result.

Figure 18:
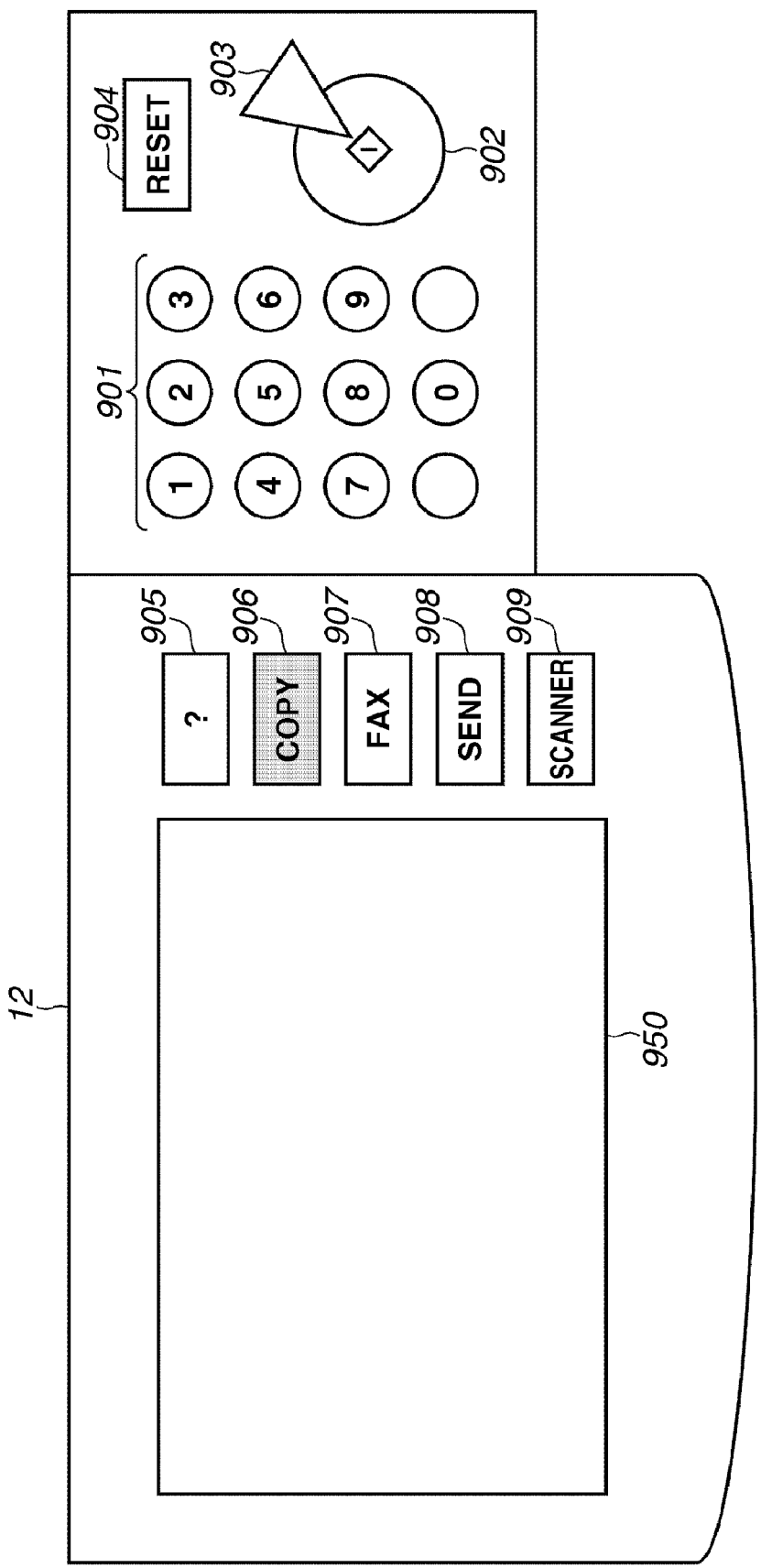
FIG. 18 illustrates an example operation unit of an image forming apparatus.
Figure 19:
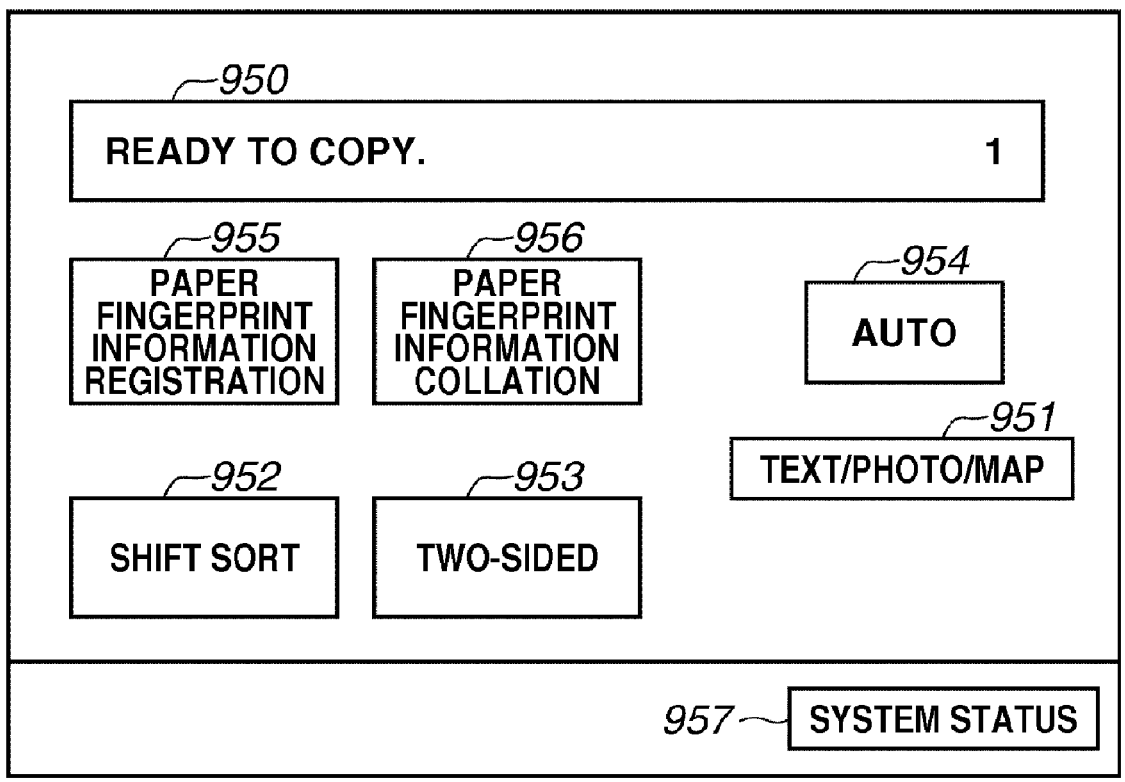
FIG. 19 illustrates a basic screen displayed on an LCD display unit of the operation unit.

FIG. 18 illustrates the operation unit 12 of an image forming apparatus. A liquid crystal display (LCD) display unit 950 includes a touch panel sheet attached on the LCD, which can display an operation screen for the image forming apparatus and, if a displayed key is pressed, transmit positional information of the key to the CPU 301. FIG. 19 illustrates an example of a screen.

A numeric keypad 901 enables a user to input numerical values, such as number of copies. After a user completes settings of desired conditions, the user can press a start key 902 to instruct a copy operation or a document reading operation. A stop key 903 enables a user to stop the operation of the image forming apparatus currently in progress.

A reset key 904 enables a user to initialize the settings entered via the operation unit 12. A user can press a guide key 905 when the user wants to display an explanation about the function of a key. A user can press a copy mode key 906 to set a copy mode. A user can press a FAX key 907 to perform settings relating to facsimile functions. A user can press a SEND key 908 to output file data to a computer or an external apparatus. A user can press a scanner key 909 to perform settings relating to processing for reading an image from a computer or an external apparatus.

FIG. 19 illustrates a basic screen displayed on the LCD display unit 950 of the operation unit 12. The LCD display unit 950 indicates whether the image forming apparatus 10 is ready for copy, in addition to the number of copies set by a user. A document selection tab 951 enables a user to designate the type of a document. When a user clicks on the document selection tab 951, three types of selection menus of text, photo, and text/photo modes are pop-up displayed. A finishing tab 952 enables a user to perform settings relating to various finishing processing.

A two-sided setting tab 953 enables a user to perform settings relating to two-sided reading and two-sided printing. A reading mode tab 954 enables a user to select a reading mode of the document. When a user clicks on the reading mode tab 954, three types of color/black/auto (ACS) selection menus are pop-up displayed. If a user selects "color", the copy mode is set to "color copy." If a user selects "black", the copy mode is set to "monochromatic copy." If a user selects "ACS", the copy mode is determined according to the above-described monochrome/color determination signal.

A paper fingerprint information registration tab 955 enables a user to instruct paper fingerprint information registration processing, which is described below. A paper fingerprint information collation tab 956 enables a user to instruct paper fingerprint information collation processing, which is described below.

A system status tab 957 enables a user to display a status of the image forming apparatus 10. When a user clicks on the system status tab 957, the LCD display unit 950 displays a list of image data stored in the HDD 304 of the image forming apparatus 10.

Combined paper fingerprint information reading and image reading processing according to an exemplary embodiment is described below, which is performed by the image forming apparatus 10 including the document feeder 201 provided in the scanner unit 13.

FIG. 20 illustrates an example arrangement of the scanner unit 13, which includes the document feeder 201, which can conveys a document in a feeding-reading mode. In an exemplary embodiment of the present invention, a plurality of reading modes can be referred to as "first reading mode" and "second reading mode".

A user places a document on the document tray 202, which serves as a document stacking unit. The document feeder 201 includes a document-sending portion, in which a sending roller (not illustrated) serving as a sending unit guides a document stack set on the document tray 202 to the separation unit 203 and separates a topmost paper from the document stack. Conveyance rollers 204 and 205 convey a separated paper. Registration rollers 206 are in a stationary state when a leading edge of the conveyed paper arrives to cause the paper to form a loop while the conveyance rollers 204 and 205 convey the paper.

Namely, the registration rollers 206 perform a skew correction and convey the adjusted paper to a document-reading portion. In the document-reading portion of the document feeder 201, the registration rollers 206 and a reading belt 208 convey a document conveyed from the above-described document-sending portion to the position R1 at a predetermined speed. When the leading edge of a document reaches the reading position R1, the optical unit 212 positioned (stopped) at the reading position R1 can perform exposure processing and perform a reading operation while conveying the document. Namely, the document-reading portion performs a reading operation according to the "feeding-reading mode."

On the other hand, the registration rollers 206 and the reading belt 208 stop a document when a trailing edge of the sheet reaches the reading position R1. The optical unit 212 moves in a direction indicated by an arrow until it reaches a position R2 to perform a reading operation while performing exposure. Namely, the document-reading portion performs a reading operation according to the "fixed-reading mode."

When the document reading operation is completed, the reading belt 208 conveys the document to a document discharging portion. The document discharging portion includes discharge rollers 209 that discharge a document to a discharge tray 210. The document discharging portion includes a reverse surface optical unit 211 configured to read an image on a reverse surface. If a user instructs reading a two-sided document, the reverse surface optical unit 211 can acquire an image of a reverse surface.

In FIG. 20, the document feeder 201 includes various sensors S1 to S7 and VR1.

A large size detection sensor S1 and a small size detection sensor S2 detect the length of a document placed on the document tray 202. A document width guide 207 accommodates a width detection volume (potentiometer) VR1 and a width detection sensor S3. A size sensor S4 detects a separated and fed document at both leading and trailing edges of the document sheet to measure the length of the document. A read sensor S5 detects the leading edge of a document and generates a reading signal. A discharge sensor S6 detects a document discharged from the document feeder 201. A document setting sensor S7 (not illustrated) determines whether a document is set on a document tray 105.

Figure 21:
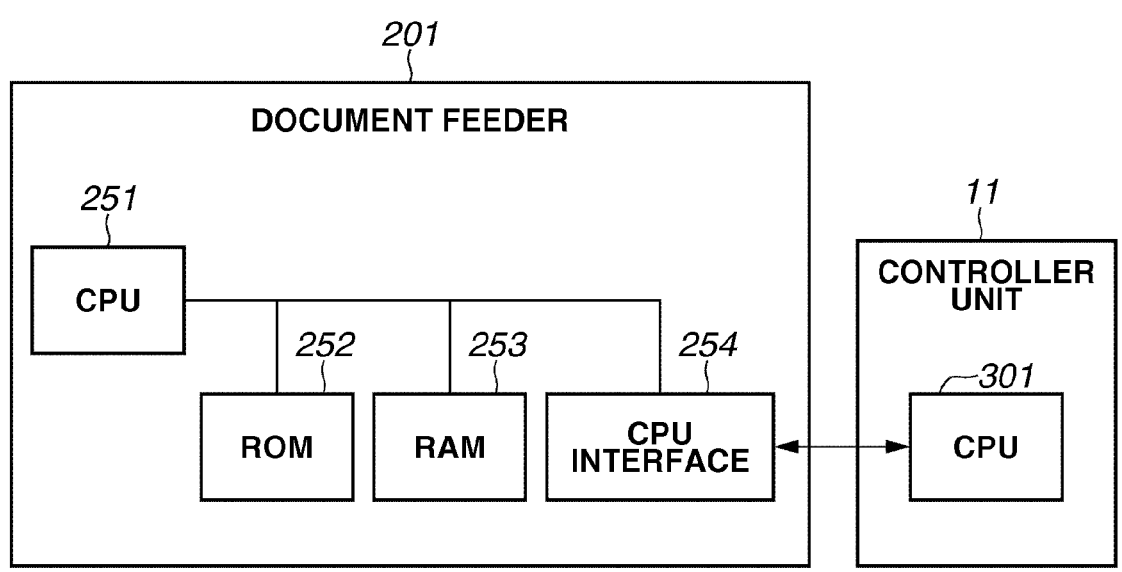
FIG. 21 is a block diagram illustrating a document feeder of the scanner unit.

FIG. 21 is a block diagram illustrating the document feeder 201. The document feeder 201 includes a central processing unit (CPU) 251, a read-only memory (ROM) 252, a random access memory (RAM) 253, and a CPU interface 254. The CPU 251 is connected to the ROM 252, the RAM 253, and the CPU interface 254 via a bus.

The CPU 251 controls automatic document feeding processing performed by the document feeder 201. The ROM 252 stored program(s). The RAM 253 is usable as a memory area temporarily storing control data and a work area when the CPU 251 performs calculations for various controls. The CPU interface 254 performs real-time communications with the CPU 301 of the controller unit 11. In response to a command sent from the CPU 301, the CPU 251 performs automatic document feeding processing performed by the document feeder 201.

The document feeder 201 includes the width detection volume VR1 and various sensors, such as large size detection sensor S1, small size detection sensor S2, width detection sensor S3, size sensor S4, read sensor S5, discharge sensor S6, and document setting sensor S7.

The document feeder 201 separates a document sheet. The document feeder 201 includes a separation/feeding motor M1, a registration motor M2, a conveyance belt motor M3, and a discharge motor M4, in addition to a clutch CL1 and solenoids SL1 and SL2. The separation/feeding motor M1 drives the conveyance rollers 204 and 205. The registration motor M2 drives the registration rollers 206. The conveyance belt motor M3 drives the reading belt 208. The discharge motor M4 drives the discharge rollers 209.

The CPU 251 controls the width detection volume VR1 and various sensors S1 to S7.

First, a user puts a document on the document tray 202 of the document feeder 201 and performs document reading settings on the operation unit 12. For example, the user selects the paper fingerprint information registration tab 955 or the paper fingerprint information collation tab 956, and performs document size designation. The designated size is usable to read an image.

Furthermore, the user can perform various settings on the operation unit 12 to determine whether the document is a two-sided document, whether the document is a mixed stack, and whether the mode to read the document is a fixed-reading mode. After completing the settings, the user presses the start key 902.

Figure 22:
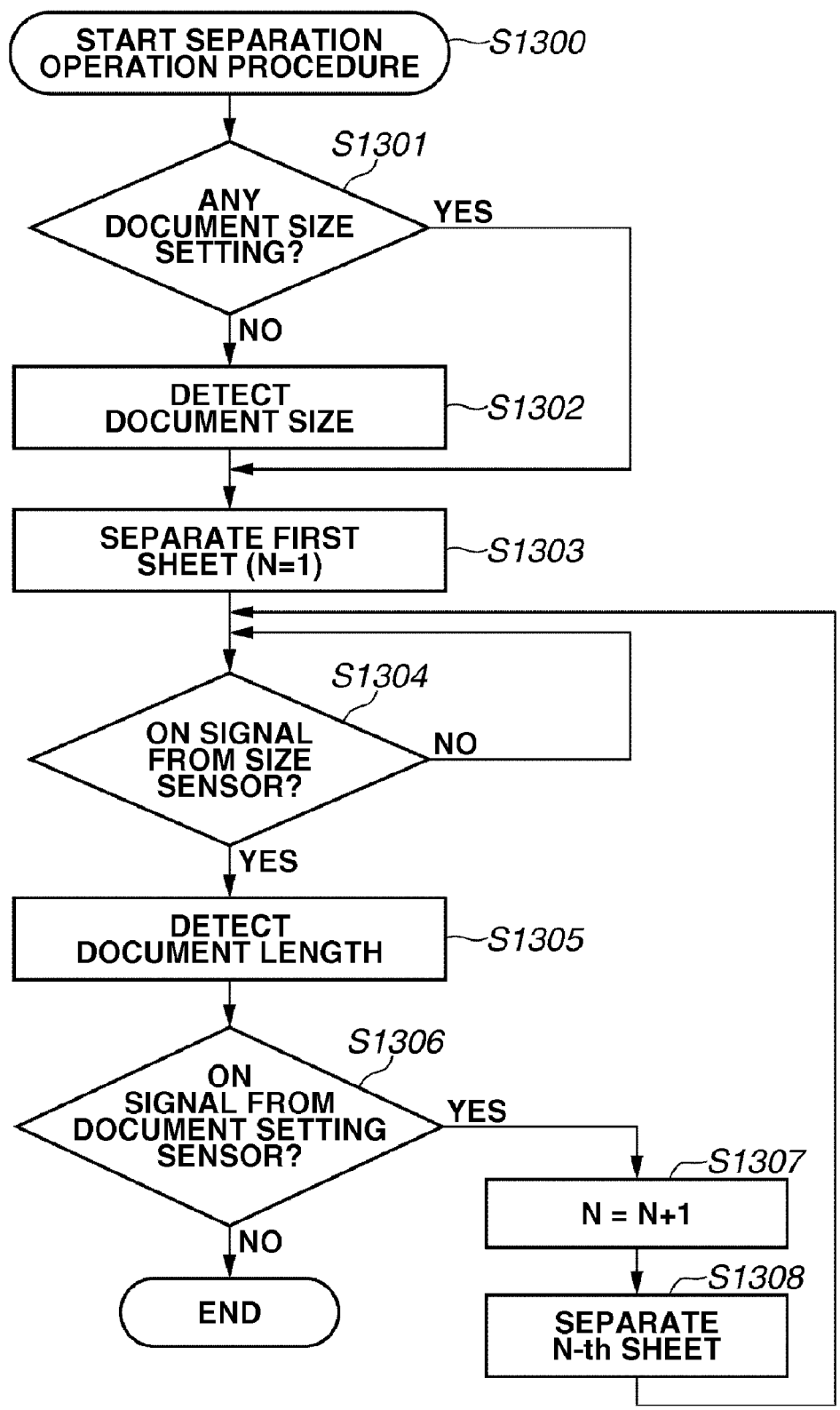
FIG. 22 is a flowchart illustrating example separation processing performed by the document feeder.

FIG. 22 is a flowchart illustrating example separation operation performed by the document feeder 201 when a user presses the start key 902. According to an exemplary embodiment, two document sheets of A4 size are set on the document tray 202 and the document feeder 201 performs a separation operation according to the following procedure.

In step S1300, the document feeder 201 starts a separation operation procedure in response to user's instruction entered via the start key 902. In step S1301, the CPU 251 determines whether there is any document size setting designated by the user. If the CPU 251 determines that there is no document size designation (NO in step S1301), the CPU 251 executes the following processing.

More specifically, in step S1302, the CPU 251 identifies the size of a document based on signals obtained from the large size detection sensor S1, the small size detection sensor S2, the width detection volume VR1, and the width detection sensor S3 disposed on the document tray 105. In an exemplary embodiment, the CPU 251 specifies the document size as A4 size. In step S1303, the CPU 251 causes the sending roller (not illustrated) to send and separate the first document sheet (N=1) to the separation unit 203, and causes the conveyance rollers 204 and 205 to convey the separated paper.

In step S1304 (i.e., after a trailing edge of the first document sheet passes the size sensor S4), the CPU 251 determines whether a reading signal of the size sensor is ON. If the reading signal of the size sensor is OFF (NO in step S1304), the CPU 251 repeats the processing of step S1304. If the reading signal of the size sensor is ON (YES in step S1304), the processing proceeds to step S1305.

In step S1305, the CPU 251 measures the length of the document by counting motor clock pulses supplied to the separation/feeding motor M1. The measured length of the document is usable to identify the length when mixed loading of document sheets is set.

In step S1306, the CPU 251 determines whether there is the next document sheet. More specifically, the CPU 251 determines whether a reading signal of the document setting sensor S7 is ON. If the reading signal of the document setting sensor S7 is ON (YES in step S1306), the CPU 251 determines that the next document sheet is set on the document tray 105. In step S1307, the CPU 251 increments N by 1 (N=N+1). In step S1308, the CPU 251 causes the separation unit 203 to separate the N-th sheet (N=2 in this case) of the document stack and repeats the above-described processing on the separated sheet.

If the reading signal of the document setting sensor S7 is OFF (NO in step S1306), the CPU 251 determines that all sheets of the document stack have been processed and completes the separation processing.

<Combined Paper Fingerprint Information Registration and Image Reading Processing 1-1 Performed by the Document Feeder>

When a user clicks on the paper fingerprint information registration tab 955 to validate paper fingerprint information registration of a document and designates a plurality of copies of the document, the document feeder 201 performs reading processing according to the following procedure. For example, a user registers a user's document as an authentic original document to generate a plurality of copies of the registered authentic original document.

Figure 23:
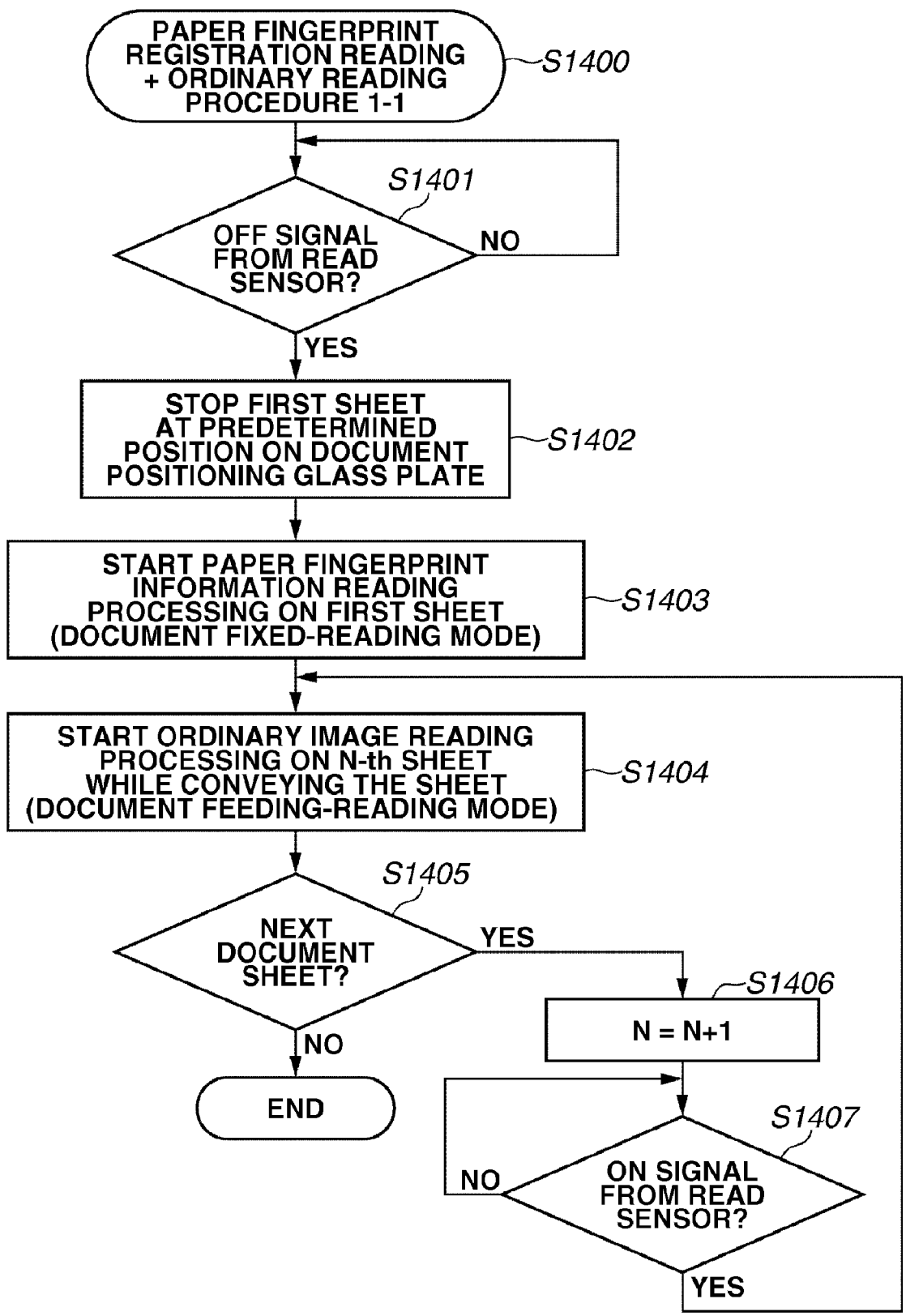
FIG. 23 is a flowchart illustrating combined paper fingerprint reading and ordinary reading processing according to an exemplary embodiment of the present invention.

FIG. 23 illustrates an example processing procedure of paper fingerprint information registration performed only for the first page of a document stack (i.e., a stack of a plurality of sheets) according to the fixed-reading mode and image reading processing performed for the document stack according to the feeding-reading mode.

In step S1400, the document feeder 201 starts combined paper fingerprint registration reading and ordinary reading procedure 1-1. In step S1401, after the registration rollers 206 correct skew of a leading edge of the first document sheet (N=1) separated by the separation operation procedure illustrated in FIG. 22, the CPU 251 waits for a while until a trailing edge of the first document sheet reaches the read sensor S5.

More specifically, if the read sensor S5 generates a reading signal of ON (NO in step S1401), the CPU 251 repeats the processing of step S1401. If the reading signal of the read sensor S5 is OFF (YES in step S1401), the processing proceeds to step S1402.

In step S1402, the document feeder 201 stops the first document sheet at a predetermined position on the document positioning glass plate. More specifically, after the trailing edge of the first document sheet reaches the read sensor S5, the trailing edge of the sheet stops at the position R1 where the optical unit 212 is located.

In step S1403, the CPU 251 starts reading paper fingerprint information on the first document sheet while moving the optical unit 212. In step S1403, the CPU 301 in the controller unit 11 causes the scanner image processing unit 312 to set a small gain adjustment value, which is smaller than an ordinary gain adjustment value, for the shading correction unit 500. Then, respective luminance signal values obtained by applying the above-described small gain adjustment value to image data are output to the paper fingerprint information acquisition unit 507. Then, the paper fingerprint information acquisition unit 507 acquires paper fingerprint information based on the output data.

Then, the paper fingerprint information acquisition unit 507 transmits the acquired paper fingerprint information to the RAM 302 via the data bus (not illustrated). In step S1404, after completely reading the paper fingerprint information, the CPU 251 stops (positions) the optical unit 212 at the position R2 while resuming conveying the document to read an image on the first document sheet according to the feeding-reading mode. The CPU 251 sets an ordinary gain for image reading processing.

In below-described other processing for reading paper fingerprint information and an (document) image, the CPU 251 sets a small gain adjustment value for the paper fingerprint information reading processing and sets an ordinary gain adjustment value for the (document) image reading processing. Although described in a second exemplary embodiment, effects similar to those of the gain adjustment can be obtained by changing the light quantity of a lamp of the optical unit between the paper fingerprint information reading operation and the ordinary image reading operation.

If the CPU 251 determines that the next document sheet is present (YES in step S1405), the processing proceeds to step S1406. In step S1406, the CPU 251 increments N by 1 (N=N+1). In step S1407, after the leading edge of the document reaches the read sensor S5, the CPU 251 determines whether a reading signal of the read sensor S5 is ON. If the reading signal of the read sensor S5 is ON (YES in step S1407), the processing proceeds to step S1404.

In step S1404, the CPU 251 causes the optical unit 212 to read an image on the second sheet at the position R2 according to the feeding-reading mode. If the reading signal of the read sensor S5 is OFF (NO in step S1407), the CPU 251 repeats the processing of step S1407. If the CPU 251 determines that the next document sheet is not present (NO in step S1405), the document feeder 201 discharges the read final document and completes the reading operation.

<Combined Paper Fingerprint Information Registration and Image Reading Processing 1-2 Performed by the Document Feeder>

The document feeder 201 performs example processing for registering paper fingerprint information for all pages of a document stack and generating a plurality of copies of the document. For example, a user registers each page of a document stack as an authentic original document to generate a copy of the registered authentic original document.

Figure 24:
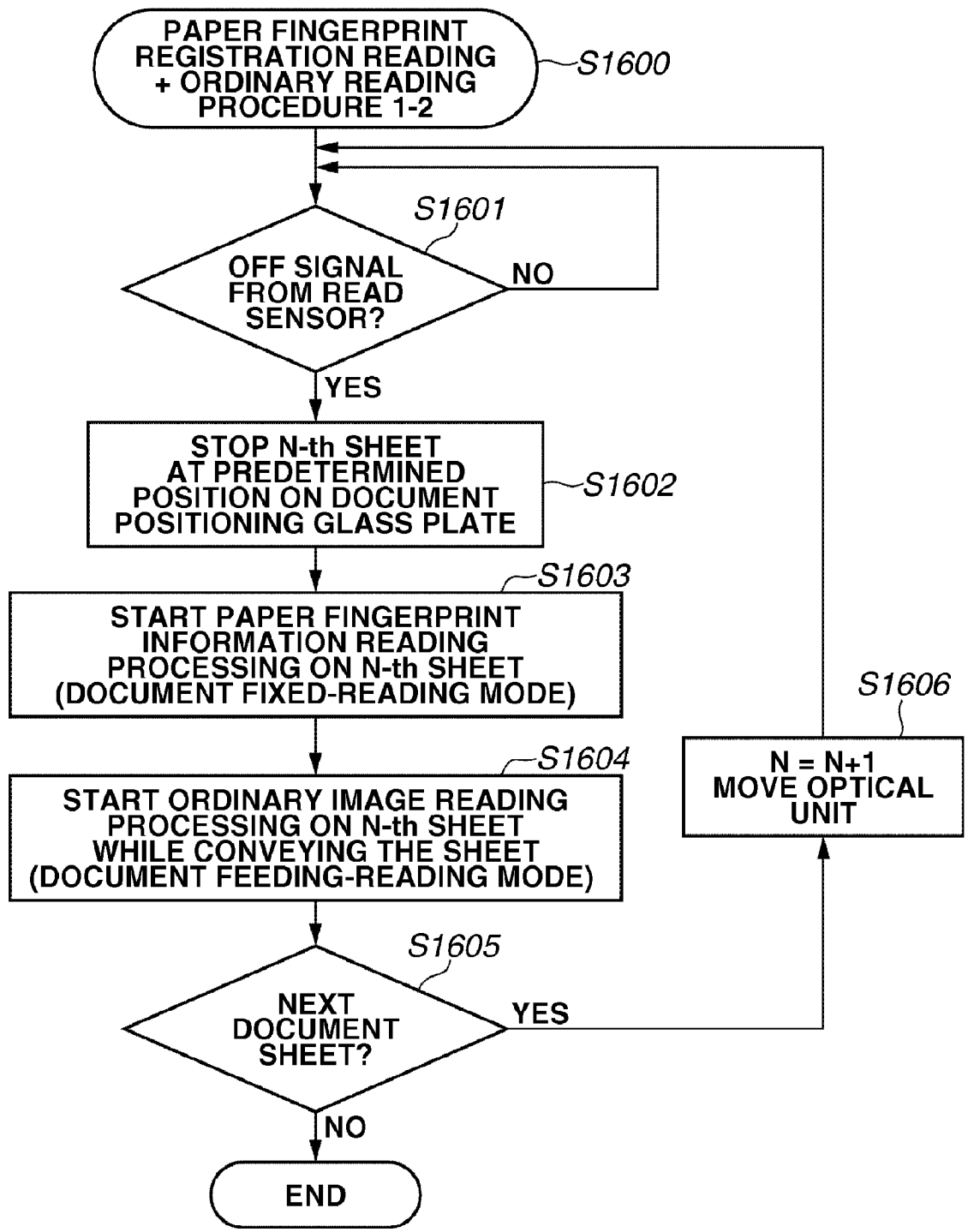
FIG. 24 is a flowchart illustrating combined paper fingerprint reading and ordinary reading processing according to an exemplary embodiment of the present invention.

FIG. 24 illustrates an example processing procedure of paper fingerprint information registration performed according to the fixed-reading mode and image reading processing performed according to the feeding-reading mode.

In step S1600, the document feeder 201 starts combined paper fingerprint registration reading and ordinary reading procedure 1-2. In step S1601, after the registration rollers 206 correct skew of a leading edge of the first document sheet (N=1) separated by the separation operation procedure illustrated in FIG. 22, the CPU 251 waits for a while until a trailing edge of the first document sheet reaches the read sensor S5. Then, the CPU 251 determines whether that a reading signal of the read sensor S5 is OFF. More specifically, if the reading signal of the read sensor S5 is ON (NO in step S1601), the CPU 251 repeats the processing of step S1601. If the reading signal of the read sensor S5 is OFF (YES in step S1601), the processing proceeds to step S1602.

In step S1602 (i.e., after the trailing edge of the first document sheet reaches the read sensor S5), the document feeder 201 stops the first document sheet on the document positioning glass plate when the trailing edge of the first document sheet reaches the position R1 where the optical unit 212 is located. In step S1603, the CPU 251 causes the optical unit 212 to move and start reading paper fingerprint information. In step S1604 (after completing the reading of paper fingerprint information), the CPU 251 stops (locates) the optical unit 212 at the position R2 and starts reading an image on the first document sheet in the document feeding-reading mode while the document feeder 201 resumes conveying the document sheet.

If the CPU 251 determines that the next document sheet is present (YES in step S1605), the processing proceeds to step S1606. In step S1606, the CPU 251 increments N by 1 (N=N+1) and, after completing the reading of the image on the first document sheet, returns the optical unit 212 to the position R1. Then, if in step S1601 the CPU 251 determines that the trailing edge of the next document sheet has reached the read sensor S5, the document feeder 201 stops the second document sheet at the position R1 on the document positioning glass plate. The CPU 251 repeats the above-described operations in steps S1603 and 1604. If the CPU 251 determines that the next document sheet is not present (NO in step S1605), the document feeder 201 discharges the read final document and completes the reading operation.

<Combined Paper Fingerprint Information Registration and Image Reading Processing 2-1 Performed by the Document Feeder>

The document feeder 201 performs reading processing when a user performs paper fingerprint information registration via the paper fingerprint information registration tab 955 and generates a plurality of copies of the document. For example, a user registers a document as an authentic original document to generate a plurality of copies of the registered authentic original document. In this case, the user can perform paper fingerprint information registration only for the first page of a document stack including a plurality of pages.

Figure 25:
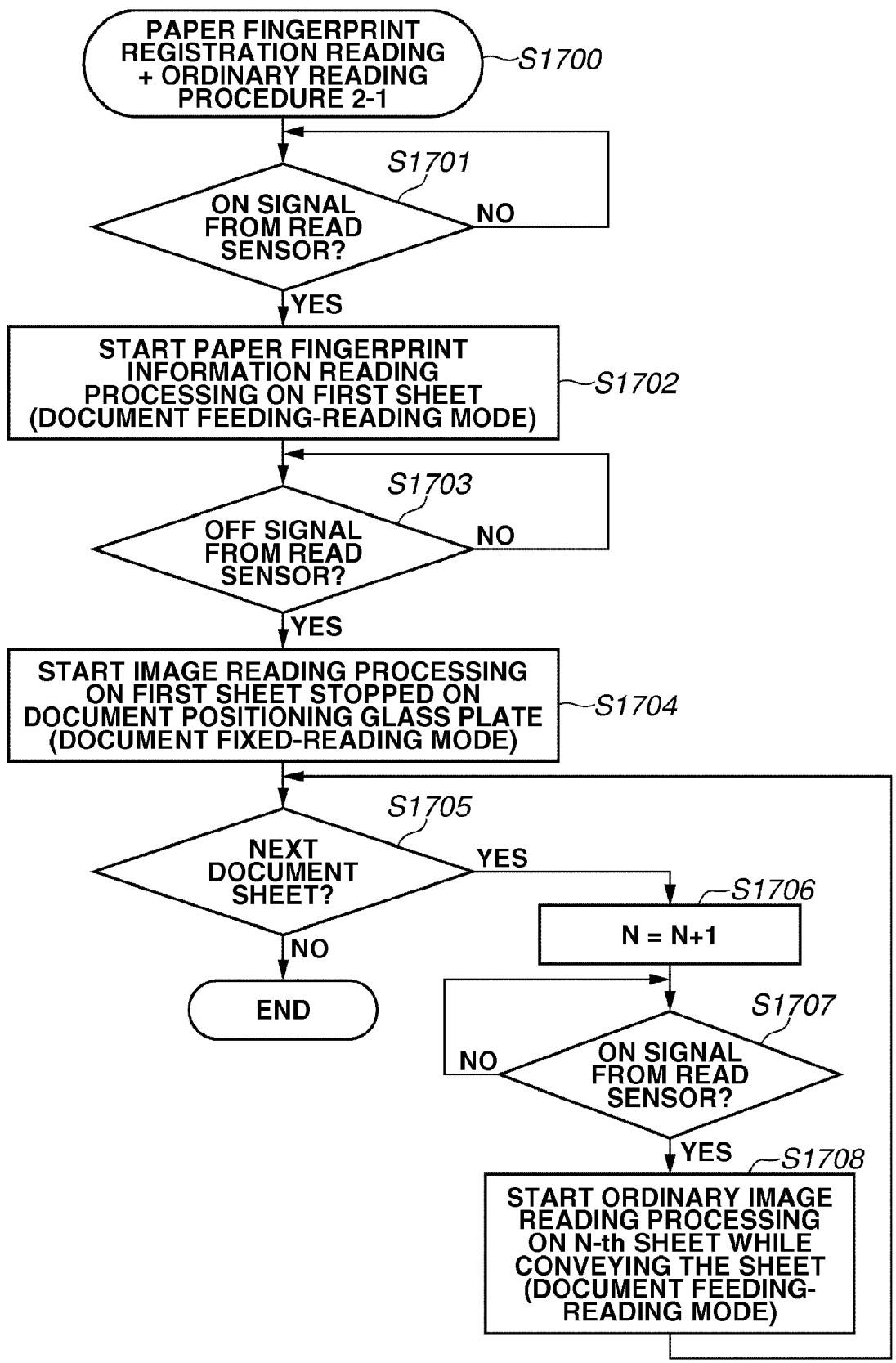
FIG. 25 is a flowchart illustrating combined paper fingerprint reading and ordinary reading processing according to an exemplary embodiment of the present invention.

FIG. 25 illustrates an example processing procedure of paper fingerprint information registration performed according to the feeding-reading mode and image reading processing performed for the first document sheet according to the fixed-reading mode. The processing procedure includes image reading processing performed for the second and subsequent document sheets according to the feeding-reading mode.

In step S1700, the document feeder 201 starts combined paper fingerprint registration reading and ordinary reading procedure 2-1. In step S1701, after the registration rollers 206 correct skew of a leading edge of the first document sheet (N=1) separated by the separation operation procedure illustrated in FIG. 22, the CPU 251 waits for a while until the leading edge of the first document sheet reaches the read sensor S5. More specifically, if the reading signal of the read sensor S5 is OFF (NO in step S1701), the CPU 251 repeats the processing of step S1701. If the reading signal of the read sensor S5 is ON (YES in step S1701), the processing proceeds to step S1702.

In step S1702 (i.e., after the leading edge of the first document sheet reaches the read sensor S5), the document feeder 201 conveys the first document sheet to let the first document sheet pass the position R1 where the optical unit 212 is located and causes the optical unit 212 in a stationary state to read paper fingerprint information.

In step S1703, the CPU 251 waits for a while until a trailing edge of the first document sheet reaches the read sensor S5. More specifically, if the reading signal of the read sensor S5 is ON (NO in step S1703), the CPU 251 repeats the processing of step S1703. If the reading signal of the read sensor S5 is OFF (YES in step S1703), the processing proceeds to step S1704.

In step S1704 (i.e., after the trailing edge of the first document sheet reaches the read sensor S5), the document feeder 201 stops the first document sheet on the document positioning glass plate when the trailing edge of the first document sheet reaches the position R1 where the optical unit 212 is located. Then, the CPU 251 causes the optical unit 212 to move and start reading an image on the first document sheet. If the CPU 251 determines that the next document sheet is present (YES in step S1705), the processing proceeds to step S1706. In step S1706, the CPU 251 increments N by 1 (N=N+1). In step S1707, the CPU 251 waits for a while until a leading edge of the next document sheet reaches the read sensor S5. More specifically, if the reading signal of the read sensor S5 is OFF (NO in step S1701), the CPU 251 repeats the processing of step S1707. If the reading signal of the read sensor S5 is ON (YES in step S1707), the processing proceeds to step S1708.

In step S1708, the CPU 251 causes the optical unit 212 positioned at the position R2 to read the second document sheet in the feeding-reading mode. Then, the CPU 251 repeats the above-described processing in steps S1705 through S1708. If the CPU 251 determines that the next document sheet is not present (NO in step S1705), the document feeder 201 discharges the read final document and completes the reading operation.

<Combined Paper Fingerprint Information Registration and Image Reading Processing 2-2 Performed by the Document Feeder>

The document feeder 201 performs example processing for registering paper fingerprint information for all pages of a document stack and generating a plurality of copies of the document. For example, a user registers each page of a document stack as an authentic original document to generate a copy of the registered authentic original document.

Figure 26:
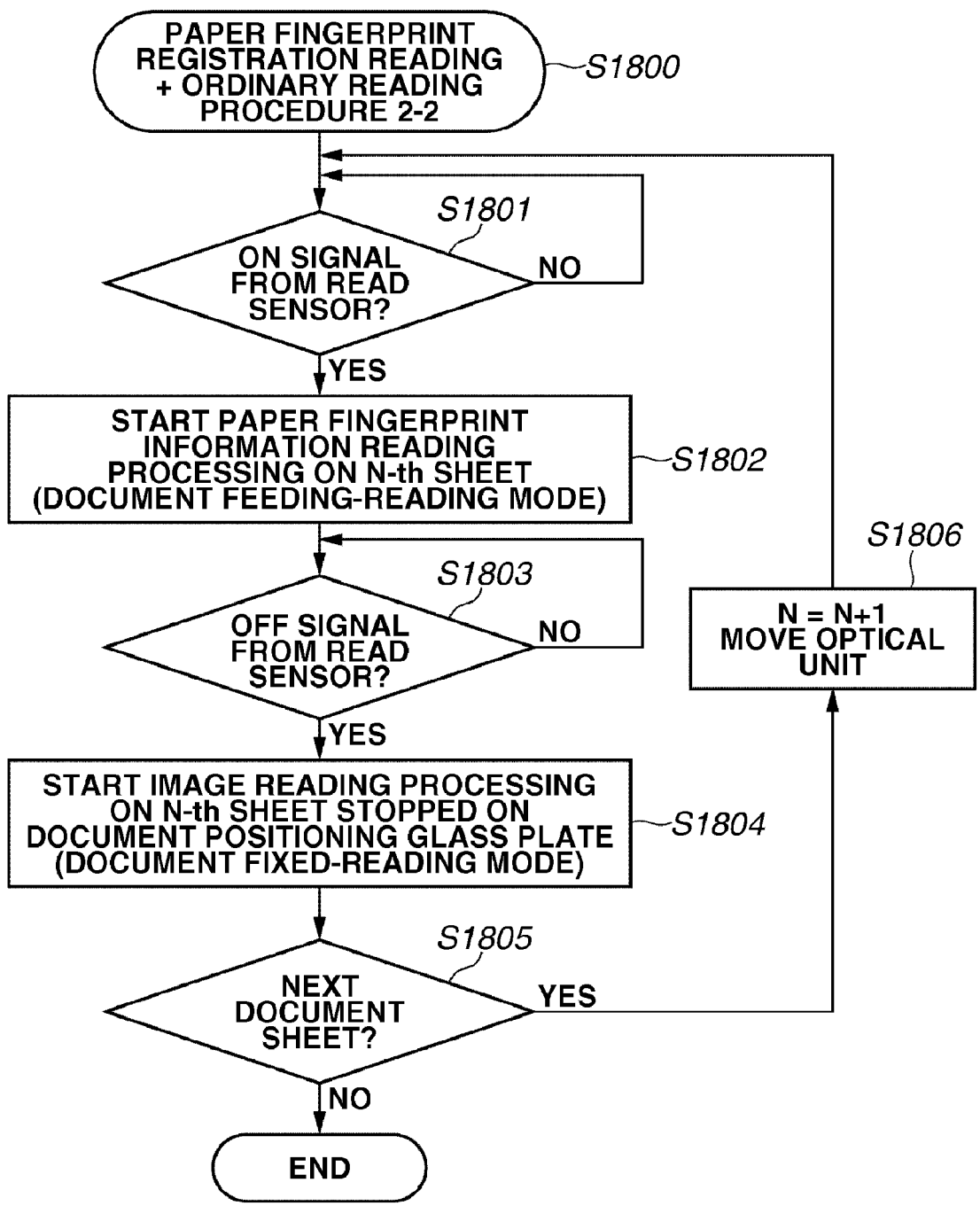
FIG. 26 is a flowchart illustrating combined paper fingerprint reading and ordinary reading processing according to an exemplary embodiment of the present invention.

FIG. 26 illustrates an example processing procedure of paper fingerprint information registration performed according to the feeding-reading mode and image reading processing performed according to the fixed-reading mode.

In step S1800, the document feeder 201 starts combined paper fingerprint registration reading and ordinary reading procedure 2-2. In step S1801, after the registration rollers 206 correct skew of a leading edge of the first document sheet (N=1) separated by the separation operation procedure illustrated in FIG. 22, the CPU 251 waits for a while until the leading edge of the first document sheet reaches the read sensor S5. More specifically, if the reading signal of the read sensor S5 is OFF (NO in step S1801), the CPU 251 repeats the processing of step S1801. If the reading signal of the read sensor S5 is ON (YES in step S1801), the processing proceeds to step S1802.

In step S1802 (i.e., after the leading edge of the first document sheet reaches the read sensor S5), the document feeder 201 conveys the first document sheet to let the first document sheet pass the position R1 where the optical unit 212 is located and causes the optical unit 212 in a stationary state to read paper fingerprint information.

In step S1803, the CPU 251 waits for a while until a trailing edge of the first document sheet reaches the read sensor S5. More specifically, if the reading signal of the read sensor S5 is ON (NO in step S1803), the CPU 251 repeats the processing of step S1803. If the reading signal of the read sensor S5 is OFF (YES in step S1803), the processing proceeds to step S1804.

In step S1804 (i.e., after the trailing edge of the first document sheet reaches the read sensor S5), the document feeder 201 stops the first document sheet when the trailing edge of the sheet reaches the position R1 on the document positioning glass plate and the CPU 251 causes the optical unit 212 to move and start reading an image on the document sheet. If the CPU 251 determines that the next document sheet is present (YES in step S1805), the processing proceeds to step S1806. In step S1806, the CPU 251 increments N by 1 (N=N+1). After completing the reading of an image on the first document sheet, the CPU 251 returns the optical unit 212 to the position R1.

Then, in step S1802 (after a leading edge of the second document sheet reaches the read sensor S5), the document feeder 201 conveys the second document sheet to let the second document sheet pass the position R1 where the optical unit 212 is located and causes the optical unit 212 in a stationary state to read paper fingerprint information. Then, the CPU 251 repeats the above-described operation in steps S1801 through S1805. If the CPU 251 determines that the next document sheet is not present (NO in step S1805), the document feeder 201 discharges the read final document and completes the reading operation.

<Combined Paper Fingerprint Information Collation and Image Reading Processing 1-1 Performed by The Document Feeder>

The document feeder 201 performs the following reading processing when a user clicks on the paper fingerprint information collation tab 956 to validate paper fingerprint information collation and inputs an authenticity management number to generate a plurality of copies of the document. For example, a user collates a user's document including paper fingerprint information registered beforehand with the authentic original document to generate a plurality of copies of the document.

Figure 27:
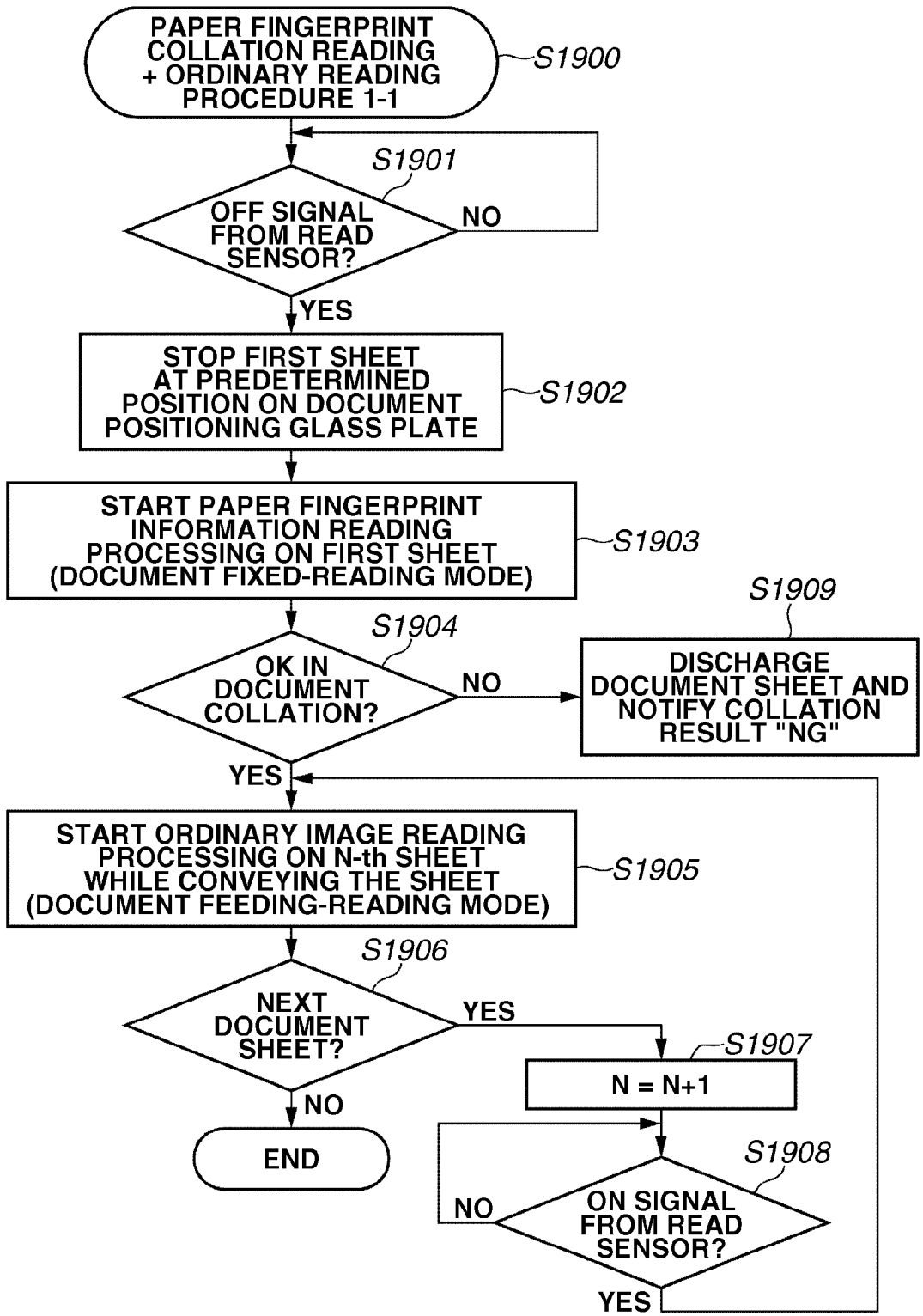
FIG. 27 is a flowchart illustrating combined paper fingerprint reading and ordinary reading processing according to an exemplary embodiment of the present invention.

FIG. 27 illustrates an example processing procedure of paper fingerprint information collation performed according to the fixed-reading mode only for the first document sheet including paper fingerprint information registered beforehand and image reading processing performed according to the document feeding-reading mode.

In step S1900, the document feeder 201 starts combined paper fingerprint collation reading and ordinary reading procedure 1-1. In step S1901, after the registration rollers 206 correct skew of a leading edge of the first document sheet (N=1) separated by the separation operation procedure illustrated in FIG. 22, the CPU 251 waits for a while until a trailing edge of the first document sheet reaches the read sensor S5. More specifically, if the reading signal of the read sensor S5 is ON (NO in step S1901), the CPU 251 repeats the processing of step S1901. If the reading signal of the read sensor S5 is OFF (YES in step S1901), the processing proceeds to step S1902.

In step S1902 (i.e., after the trailing edge of the first document sheet reaches the read sensor S5), the document feeder 201 stops the first document sheet on the document positioning glass plate when the trailing edge of the sheet reaches the position R1 where the optical unit 212 is located. In step S1903, the CPU 251 causes the optical unit 212 to move and start reading paper fingerprint information.

In step S1903, the CPU 301 in the controller unit 11 causes the scanner image processing unit 312 to perform the processing illustrated in FIG. 5 on the image data and generate attribute data associated with newly obtained image data. Furthermore, the CPU 301 determines a paper fingerprint information acquisition area based on an input management number. Then, the paper fingerprint information acquisition unit 507 in the scanner image processing unit 312 acquires paper fingerprint information from the determined paper fingerprint information acquisition area. Then, the scanner image processing unit 312 transmits the acquired paper fingerprint information to the RAM 302 via the data bus (not illustrated). Furthermore, the CPU 301 acquires, from a server via LAN or WAN, paper fingerprint information registered in association with input management number.

Then, the CPU 301 transmits the acquired information to the RAM 302 via the data bus (not illustrated). In step S1904, the CPU 301 collates the paper fingerprint information acquired via the paper fingerprint information acquisition unit 507 with the paper fingerprint information registered in the server. Namely, the CPU 301 performs the collation processing described in FIGS. 8 through 17.

In step S1905 (i.e., after the CPU 251 determines that a result of collation indicates similarity to the authentic original document (YES in step S1904)), the document feeder 201 resumes conveying the document sheet. The CPU 251 causes the optical unit 212 to stop at the position R2 and start reading an image on the first document sheet in the feeding-reading mode. If the CPU 251 determines that the next document sheet is present (YES in step S1906), the processing proceeds to step S1907.

In step S1907, the CPU 251 increments N by 1 (N=N+1) In step S1908, the CPU 251 determines whether a leading edge of the next document reaches the read sensor S5. If the CPU 251 determines that the leading edge of the next document reaches the read sensor S5 (YES in step S1908), the processing returns to step S1905, in which the CPU 251 causes the optical unit 212 to start reading an image on the next sheet at the position R2. Namely, if the reading signal of the read sensor S5 is OFF (NO in step S1908), the CPU 251 repeats the processing of step S1908. If the reading signal of the read sensor S5 is ON (YES in step S1908), the processing proceeds to step S1905 to repeat the above-described processing.

If the CPU 251 determines that the next document sheet is not present (NO in step S1906), the document feeder 201 discharges the read final document and completes the reading operation. If the result of collation does not indicate similarity to the authentic original document (NO in step S1904), then in step S1909, the document feeder 201 discharges the read document and the CPU 301 causes the operation unit 12 to display a warning indicating dissimilarity to the authentic original document without performing image reading processing.

<Combined Paper Fingerprint Information Collation and Image Reading Processing 1-2 Performed by the Document Feeder>

The document feeder 201 performs the following reading processing when a user inputs an authenticity management number for all pages of a document stack to generate a plurality of copies of the document. For example, a user collates each page of a document stack, including paper fingerprint information registered beforehand, with the authentic original document to generate a copy of the registered authentic original document.

Figure 28:
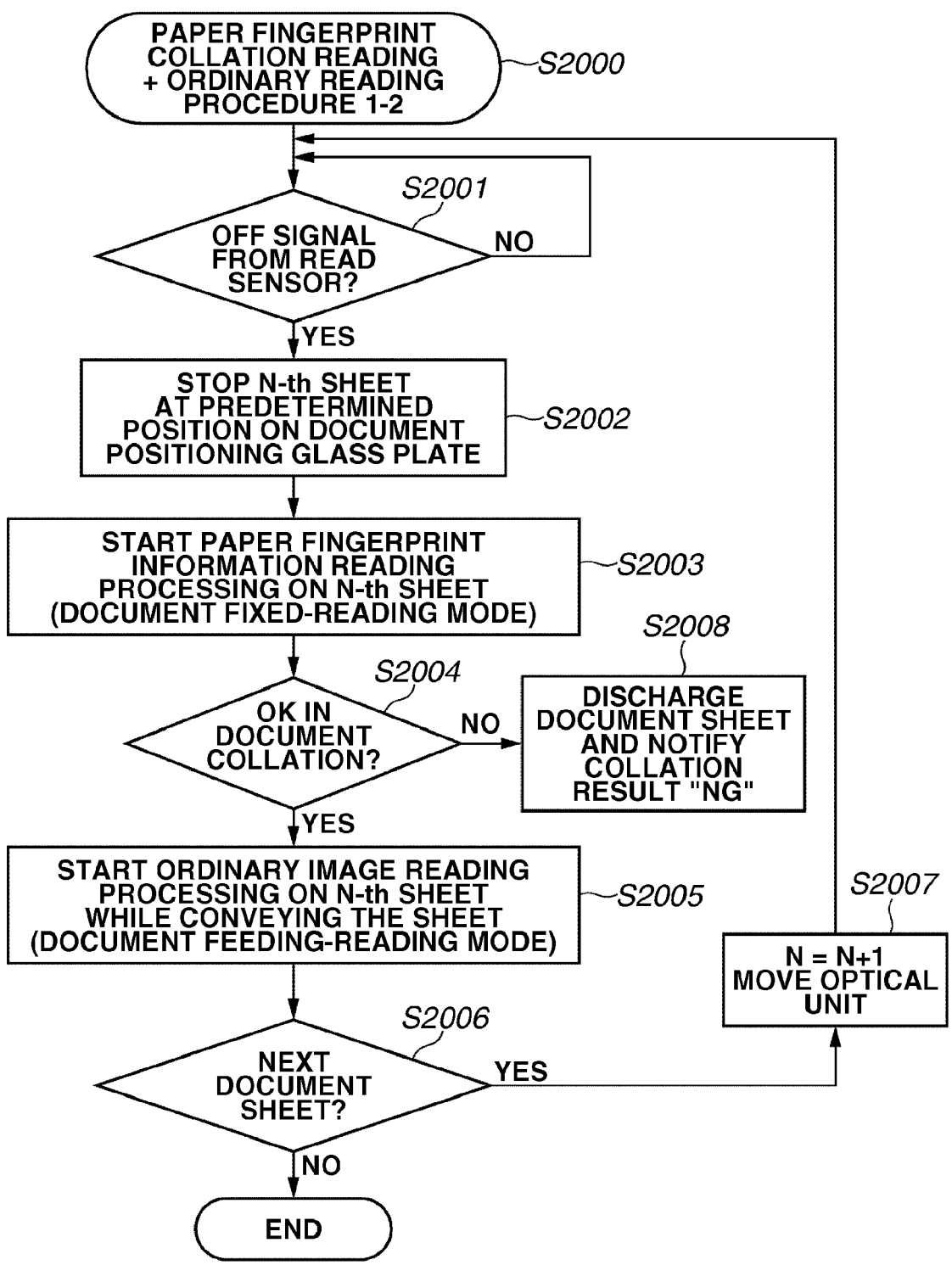
FIG. 28 is a flowchart illustrating combined paper fingerprint reading and ordinary reading processing according to an exemplary embodiment of the present invention.

FIG. 28 illustrates an example processing procedure of paper fingerprint information collation performed according to the fixed-reading mode and image reading processing performed according to the feeding-reading mode.

In step S2000, the document feeder 201 starts combined paper fingerprint collation reading and ordinary reading procedure 1-2. In step S2001, after the registration rollers 206 correct skew of a leading edge of the first document sheet (N=1) separated by the separation operation procedure illustrated in FIG. 22, the CPU 251 waits for a while until a trailing edge of the first document sheet reaches the read sensor S5. More specifically, if the reading signal of the read sensor is ON (NO in step S2001), the CPU 251 repeats the processing of the step S2001. If the reading signal of the read sensor is OFF (YES in step S2001), the processing proceeds to step S2002.

In step S2002 (i.e., after the trailing edge of the first document sheet reaches the read sensor S5), the document feeder 201 stops the first document sheet on the document positioning glass plate when the trailing edge of the sheet reaches the position R1 where the optical unit 212 is located. In step S2003, the CPU 251 causes the optical unit 212 to move and start reading paper fingerprint information. In step S2004 (i.e., after the CPU 251 completes reading the paper fingerprint information), the CPU 301 collates the paper fingerprint information acquired via the paper fingerprint information acquisition unit 507 with paper fingerprint information registered in a server.

If a result of collation indicates similarity to the authentic original document (i.e., YES in step S2004), the processing proceeds to step S2005. In step S2005, the CPU 251 causes the optical unit 212 to stop at the position R2 to read an image on the first document sheet in the feeding-reading mode while the document feeder 201 resumes conveying the document sheet. If the CPU 251 determines that the next document sheet is present (YES in step S2006), the processing proceeds to step S2007.

In step S2007, the CPU 251 increments N by 1 (N=N+1) and, after completing the reading of the image on the first document sheet, returns the optical unit 212 to the position R1. Then, if the CPU 251 determines that a trailing edge of the second document sheet reaches the read sensor S5 (YES in step S2001), the document feeder 201 stops the second document sheet on the document positioning glass plate when the trailing edge of the sheet reaches the position R1 where the optical unit 212 is located. Then, the CPU 251 repeats the above-described processing. If the CPU 251 determines that the next document sheet is not present (NO in step S2006), the document feeder 201 discharges the read final document and completes the reading operation.

If the CPU 301 determines that the result of collation does not indicate similarity to the authentic original document (NO in step S2004), then in step S2008, the document feeder discharges the read document and the CPU 301 causes the operation unit 12 to display a warning indicating dissimilarity to the authentic original document without performing image reading processing.

<Combined Paper Fingerprint Information Collation and Image Reading Processing 2-1 Performed by the Document Feeder>

The document feeder 201 performs the following reading processing when a user clicks on the paper fingerprint information collation tab 956 to validate paper fingerprint information collation and inputs an authenticity management number to generate a plurality of copies of the document. For example, a user collates a user's document including paper fingerprint information registered beforehand with the authentic original document to generate a plurality of copies.

Figure 29:
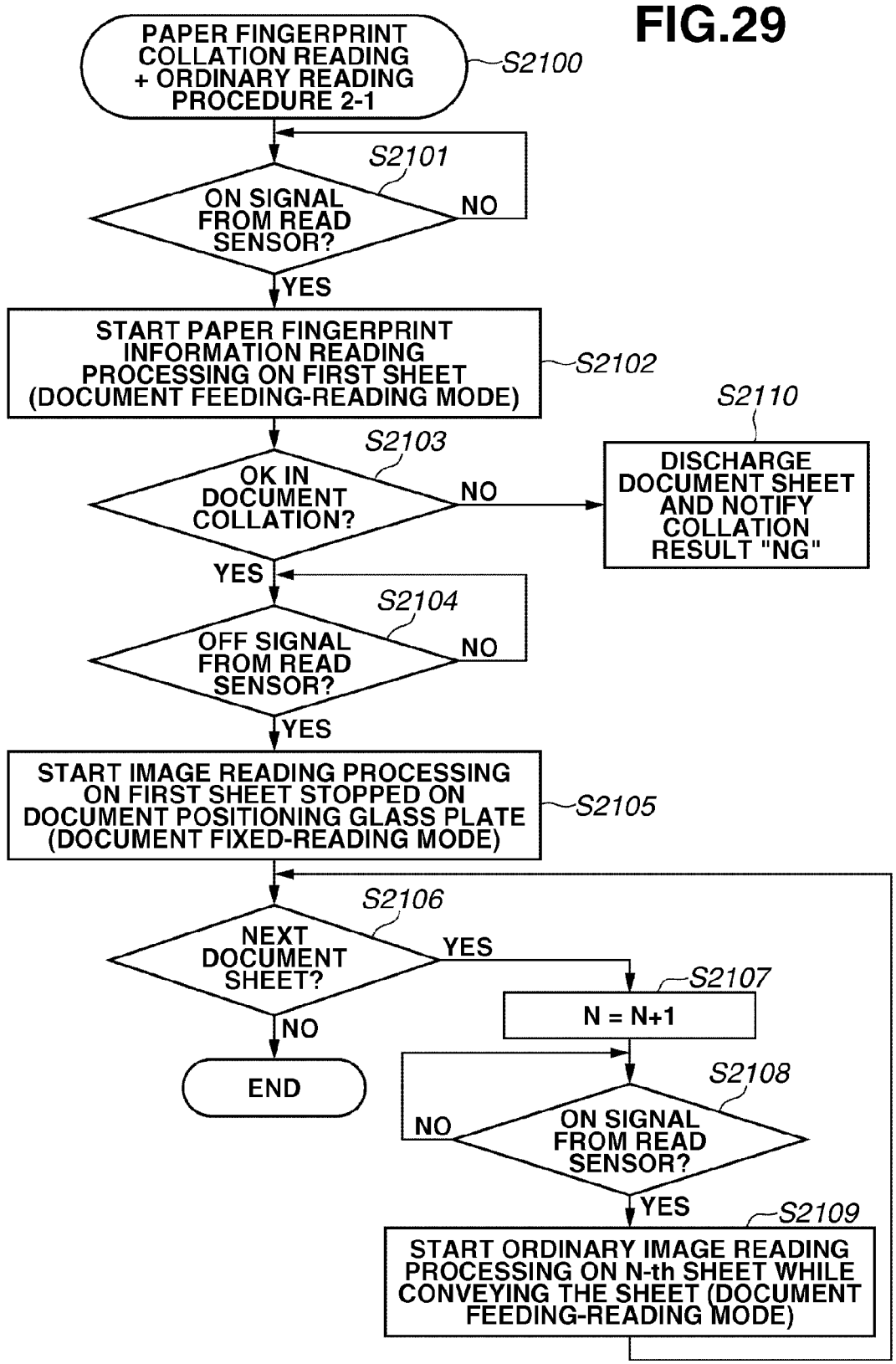
FIG. 29 is a flowchart illustrating combined paper fingerprint reading and ordinary reading processing according to an exemplary embodiment of the present invention.

FIG. 29 illustrates an example processing procedure of paper fingerprint information collation performed in the feeding-reading mode to collate only the first document sheet including the paper fingerprint information registered beforehand and image reading processing performed in the fixed-reading mode to read an image on the first document sheet. The processing procedure includes image reading processing performed for the second and subsequent document sheets according to the feeding-reading mode.

In step S2100, the document feeder 201 starts combined paper fingerprint collation reading and ordinary reading procedure 2-1. In step S2101, after the registration rollers 206 correct skew of a leading edge of the first document sheet (N=1) separated by the separation operation procedure illustrated in FIG. 22, the CPU 251 waits for a while until the leading edge of the first document sheet reaches the read sensor S5. More specifically, if the reading signal of the read sensor S5 is OFF (NO in step S2101), the CPU 251 repeats the processing of step S2101. If the reading signal of the read sensor S5 is ON (YES in step S2101), the processing proceeds to step S2102.

In step S2102 (i.e., after the leading edge of the first document sheet reaches the read sensor S5), the CPU 251 causes the optical unit 212 in a stationary state to start reading paper fingerprint information at the position R1 while the document feeder 201 conveys the first document sheet. In step S2103, the CPU 301 collates the paper fingerprint information acquired via the paper fingerprint information acquisition unit 507 with paper fingerprint information registered in a server.

If a result of collation indicates similarity to the authentic original document (YES in step S2103), the processing proceeds to step S2104. In step S2104, the CPU 251 waits for a while until the trailing edge of the first document sheet reaches the read sensor S5. More specifically, if the reading signal of the read sensor S5 is ON (NO in step S2104), the CPU 251 repeats the processing of step S2104. If the reading signal of the read sensor S5 is OFF (YES in step S2104), the processing proceeds to step S2105.

In step S2105 (after the trailing edge of the first document sheet reaches the read sensor S5), the document feeder 201 stops the sheet on the document positioning glass plate when the trailing edge of the sheet reaches the position R1. The CPU 251 causes the optical unit 212 to move to read an image on the sheet until the optical unit reaches the position R2.

If the CPU 251 determines that the next document sheet is present (YES in step S2106), the processing proceeds to step S2107. In step S2107, the CPU 251 increments N by 1 (N=N+1). In step S2108, the CPU 251 waits for a while until the leading edge of the document sheet reaches the read sensor S5. More specifically, if the reading signal of the read sensor S5 is OFF (NO in step S2108), the CPU 251 repeats the processing of step S2108. If the reading signal of the read sensor S5 is ON (YES in step S2108), the processing proceeds to step S2109.

In step S2109, the CPU 251 causes the optical unit 212 to read the second document sheet at the position R2 and repeats the above-described processing. If the CPU 251 determines that the next document sheet is not present (NO in step S2106), the document feeder 201 discharges the read final document and completes the reading operation. If the result of collation does not indicate similarity to the authentic original document (NO in step S2103), then in step S2110, the document feeder 201 discharges the read document and the CPU 301 causes the operation unit 12 to display a warning indicating dissimilarity to the authentic original document without performing image reading processing.

<Combined Paper Fingerprint Information Collation and Image Reading Processing 2-2 Performed by the Document Feeder>

The document feeder 201 performs the following reading processing when a user inputs an authenticity management number for all pages of a of document stack to generate a plurality of copies of the document. For example, a user collates each page of a user's document stack including paper fingerprint information registered beforehand with the authentic original document to generate a plurality of copies.

Figure 30:
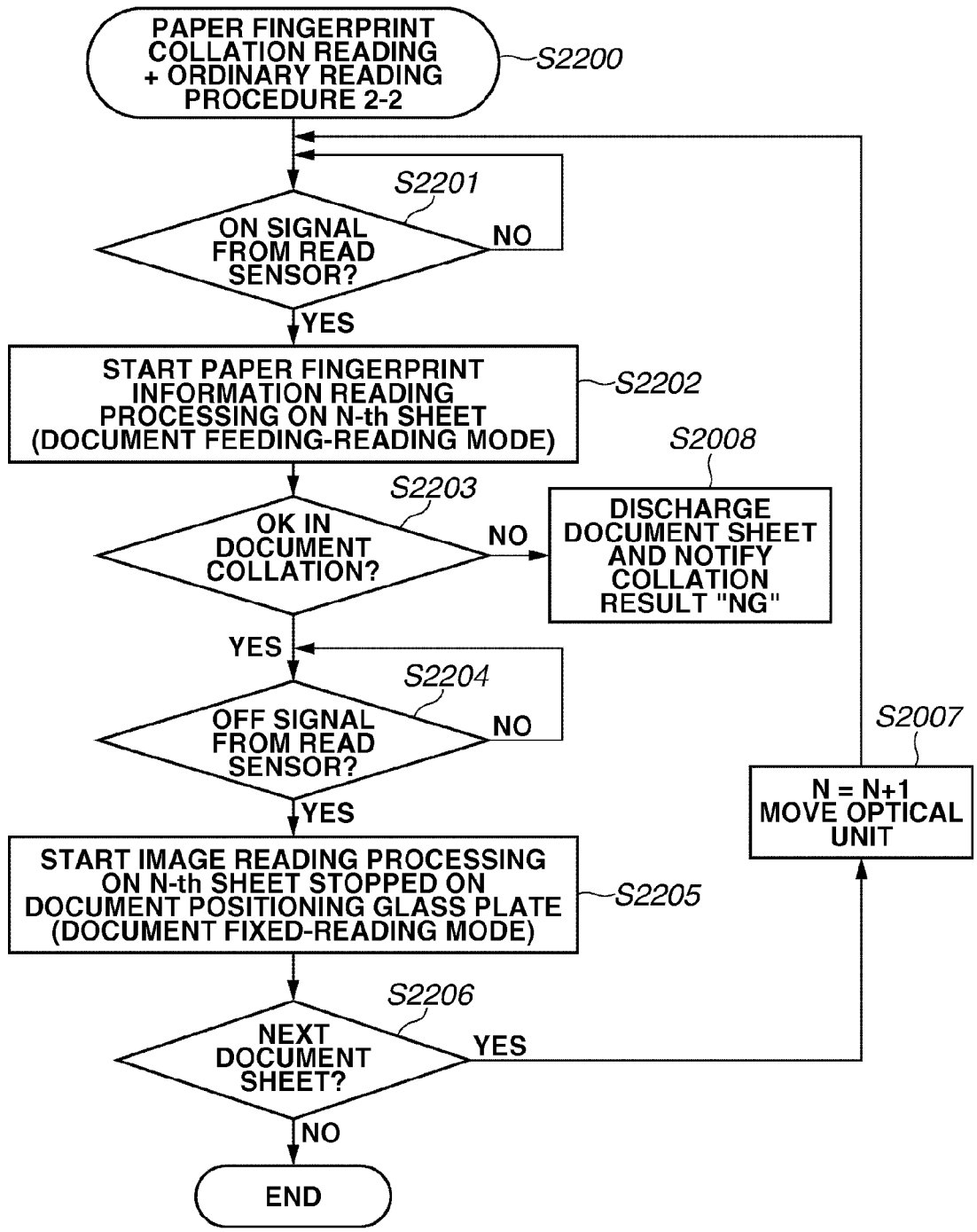
FIG. 30 is a flowchart illustrating combined paper fingerprint reading and ordinary reading processing according to an exemplary embodiment of the present invention.

FIG. 30 illustrates an example processing procedure of paper fingerprint information collation performed according to the feeding-reading mode and image reading processing performed according to the fixed-reading mode.

In step S2200, the document feeder 201 starts combined paper fingerprint collation reading and ordinary reading procedure 2-2. In step S2201, after the registration rollers 206 correct skew of a leading edge of the first document sheet (N=1) separated by the separation operation procedure illustrated in FIG. 22, the CPU 251 waits for a while until the leading edge of the first document sheet reaches the read sensor S5. More specifically, if the reading signal of the read sensor S5 is OFF (NO in step S2201), the CPU 251 repeats the processing of step S2201. If the reading signal of the read sensor S5 is ON (YES in step S2201), the processing proceeds to step S2202.

In step S2202 (i.e., after the leading edge of the first document sheet reaches the read sensor S5), the CPU 251 causes the optical unit 212 in a stationary state to start reading paper fingerprint information at the position R1 while the document feeder 201 conveys the first document sheet. In step S2203 (after the CPU 251 completes reading the paper fingerprint information), the CPU 301 collates the paper fingerprint information acquired via the paper fingerprint information acquisition unit 507 with paper fingerprint information registered in a server.

If the CPU 301 determines that a result of collation indicates similarity to the authentic original document (YES in step S2203), the processing proceeds to step S2204. In step S2204, the CPU 251 waits for a while until the trailing edge of the first document sheet reaches the read sensor S5. More specifically, if the reading signal of the read sensor S5 is ON (NO in step S2204), the CPU 251 repeats the processing of step S2204. If the reading signal of the read sensor S5 is OFF (YES in step S2204), the processing proceeds to step S2205.

In step S2205 (i.e., after the trailing edge of the first document sheet reaches the read sensor S5), the document feeder 201 stops the first document sheet on the document positioning glass plate when the trailing edge of the sheet reaches the position R1. The CPU 251 causes the optical unit 212 to move and start reading an image on the sheet. If the CPU 251 determines that the next document sheet is present (YES in step S2206), the processing proceeds to step S2207.

In step S2207, the CPU 251 increments N by 1 (N=N+1) and, after completing the reading of the image on the first document sheet, the CPU 251 returns the optical unit 212 to the position R1. Then, in step S2202 (i.e., after the leading edge of the second document sheet reaches the read sensor S5), the CPU 251 causes the optical unit 212 in a stationary state to perform reading paper fingerprint information at the position R1 while the document feeder 201 conveys the second document sheet and repeats the above-described processing.

If the CPU 251 determines that the next document sheet is not present (NO in step S2206), the document feeder 201 discharges the read final document and completes the reading operation. If the result of collation does not indicate similarity to the authentic original document (NO in step S2203), then in step S2208, the document feeder 201 discharges the read document and the CPU 301 causes the operation unit 12 to display a warning indicating dissimilarity to the authentic original document without performing image reading processing.

Figure 31A:
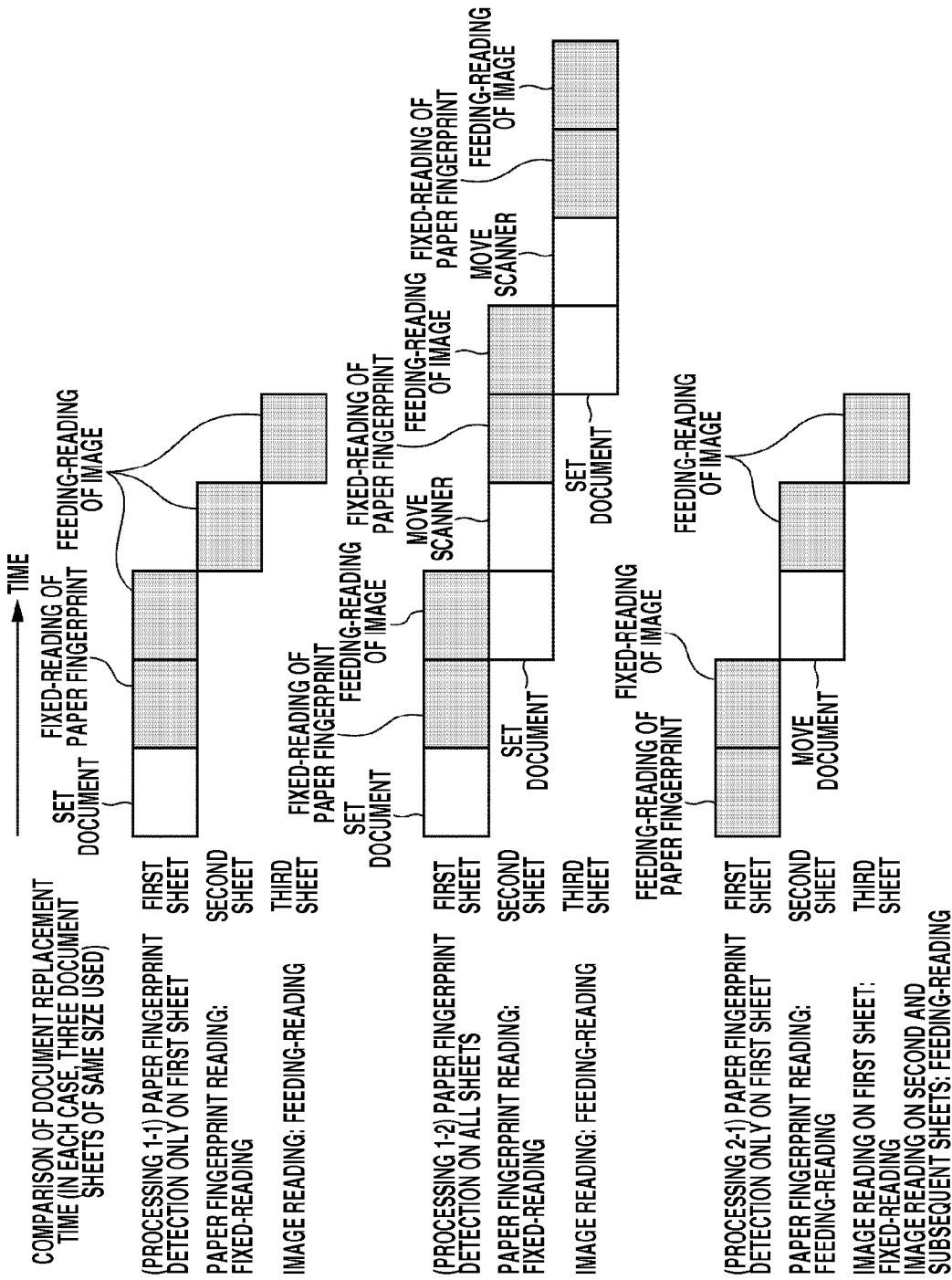
FIGS. 31A and 31B each illustrate document replacement time in each processing mode according to exemplary embodiments of the present invention.
Figure 31B:
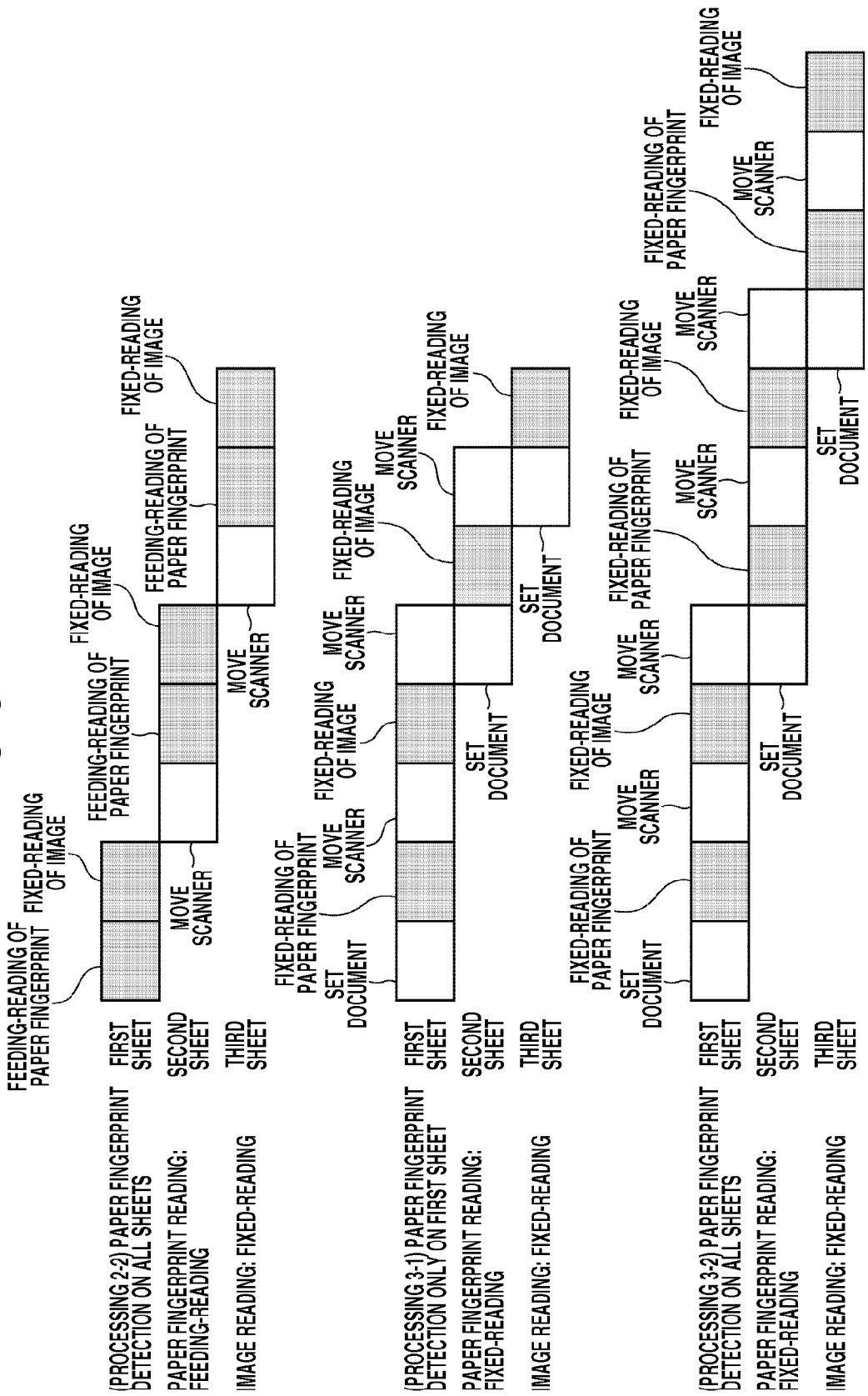

FIGS. 31A and 31B illustrate comparison of document replacement time in a case where the document feeder 201 performs the above-described combined paper fingerprint information registration or collation and image reading processing on a document including three sheets having the same size. Processing 1-1 corresponds to the paper fingerprint information registration or collation processing illustrated in FIG. 23 or FIG. 27. Processing 1-2 corresponds to the paper fingerprint information registration or collation processing illustrated in FIG. 24 or FIG. 28. Processing 2-1 corresponds to the paper fingerprint information registration or collation processing illustrated in FIG. 25 or FIG. 29. Processing 2-2 corresponds to the paper fingerprint information registration or collation processing illustrated in FIG. 26 or FIG. 30.

Processing 3-1 corresponds to the paper fingerprint information registration or collation processing performed only for the first document sheet and the combined paper fingerprint information registration or collation and image reading processing performed according to the fixed-reading mode. Processing 3-2 corresponding to the paper fingerprint information registration or collation processing performed for all document sheets and the combined paper fingerprint information registration or collation and image reading processing performed according to the document fixed-reading mode.

When the document feeder 201 performs the paper fingerprint information registration or collation processing only for the first document sheet, the replacement time of the processing 1-1 is similar to that of the processing 2-1 and shorter than that of the processing 3-1. When the document feeder 201 performs the paper fingerprint information registration or collation processing for all document sheets, the replacement time of the processing 2-2 is shortest. The replacement time of the processing 1-2 is shorter than the replacement time of the processing 3-2.

According to the above-described exemplary embodiment, a document feeder is operable in both the fixed-reading mode and the feeding-reading mode performs reading of paper fingerprint data and image data. The document feeder reads the paper fingerprint data in a reading mode selected between the fixed-reading mode and the feeding-reading mode and reads the image data in the other reading mode. Thus, an exemplary embodiment can accomplish document replacement easily and quickly without using a reversing path. Furthermore, the document feeder according to an exemplary embodiment can perform paper fingerprint information acquisition and image reading processing without using an additional image sensor.

Second Exemplary Embodiment

A document feeder according to a second exemplary embodiment of the present invention performs effective reading of paper fingerprint information and a document image in the feeding-reading mode while conveying a document sheet along the document positioning glass plate.

<Combined Paper Fingerprint Information Registration and Image Reading Processing 1 Performed by the Document Feeder>

Figure 32:
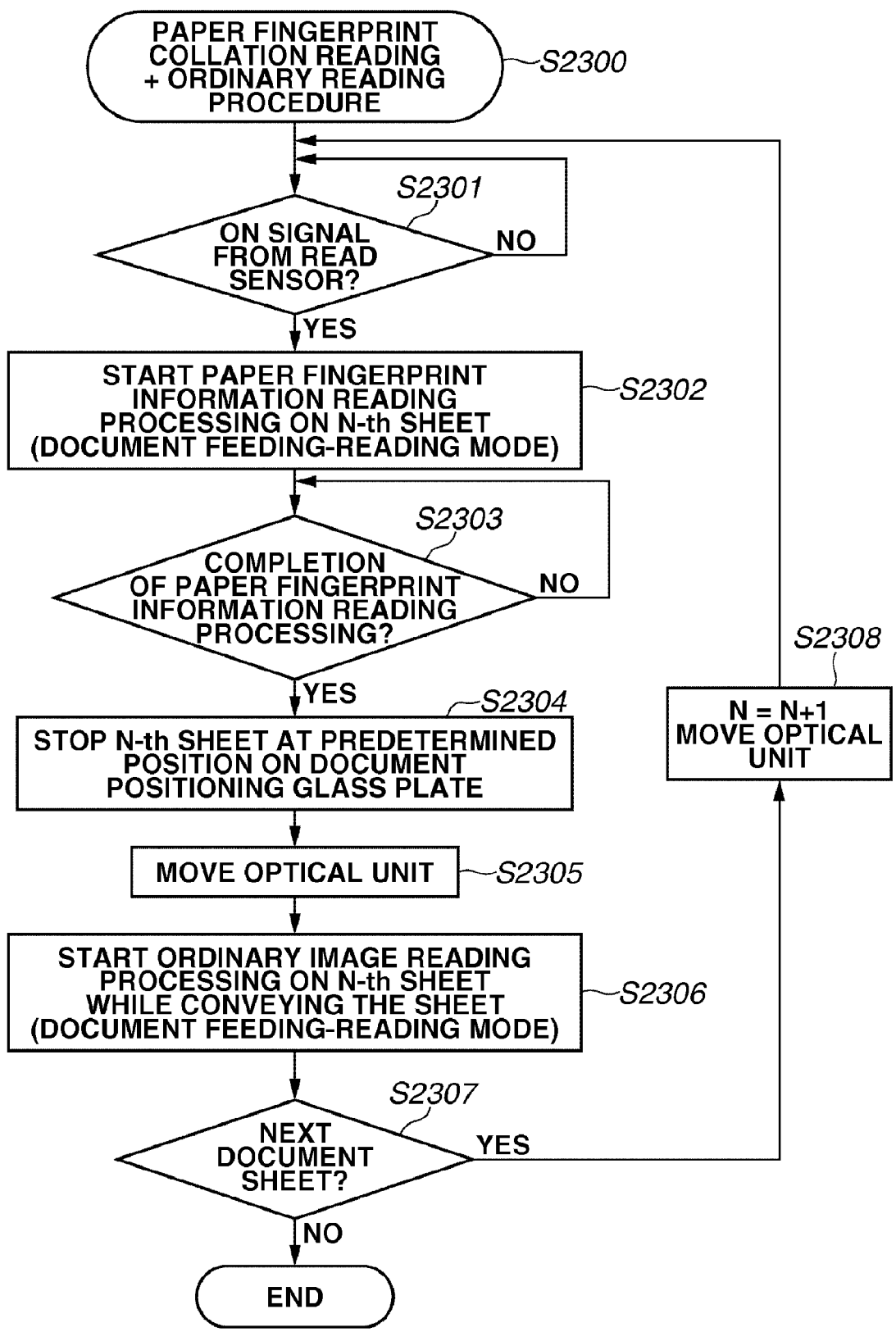
FIG. 32 illustrates combined paper fingerprint reading and ordinary reading processing according to an exemplary embodiment of the present invention.

The document feeder 201 performs the following reading processing when a user clicks on the paper fingerprint information registration tab 955 to validate paper fingerprint information registration to generate a plurality of copies of the document. For example, a user validates paper fingerprint information registration for all pages of a document stack and registers each sheet of the document as an authentic original document to generate a plurality of copies of the document. FIG. 32 illustrates an example reading processing procedure for the document feeder 201.

In step S2300, the document feeder 201 starts combined paper fingerprint registration reading and ordinary reading procedure.

In step S2301, after the registration rollers 206 correct skew of a leading edge of the first document sheet (N=1) separated by the separation operation procedure illustrated in FIG. 22, the CPU 251 waits for a while until the leading edge of the first document sheet reaches the read sensor S5. More specifically, if the reading signal of the read sensor S5 is OFF (NO in step S2301), the CPU 251 repeats the processing of step S2301. If the reading signal of the read sensor S5 is ON (YES in step S2401), the processing proceeds to step S2302.

In step S2302 (after the leading edge of the first document sheet reaches the read sensor S5), the CPU 251 causes the optical unit 212 in a stationary state to start reading paper fingerprint information at the position R1 while the document feeder 201 conveys the first document sheet.

In general, a document sheet includes a white area where a paper fiber pattern is easily detectable. In this respect, the white area is an appropriate reading position of paper fingerprint information. In particular, a leading edge area of a document sheet includes a white area including no recorded information. Accordingly, an example embodiment designates the leading edge area of the document as a paper fingerprint reading position. Furthermore, when RGB signals obtained from an area of the document have 8-bit values equal to or closer to 255, an example embodiment regards the area as a white area (i.e., as a paper fingerprint registration area).

In step S2302, the CPU 301 in the controller unit 11 causes the scanner image processing unit 312 to set a gain adjustment value smaller than an ordinary gain adjustment value for the shading correction unit 500. Then, the shading correction unit 500 obtains luminance signal values by applying the above-described small gain adjustment value to image data and outputs the obtained luminance signal values to the paper fingerprint information acquisition unit 507. Then, the paper fingerprint information acquisition unit 507 acquires paper fingerprint information based on the received data. Then, the paper fingerprint information acquisition unit 507 transmits the acquired paper fingerprint information to the RAM 302 via the data bus (not illustrated).

In step S2303, the CPU 251 determines whether the paper fingerprint position of the first document sheet has reached the R1 position and the optical unit 212 has completed reading of the paper fingerprint information. If the CPU 251 confirms completion of the reading of the paper fingerprint information (YES in step S2303), the processing proceeds to step S2304. In step S2304, the document feeder 201 stops the document sheet on the document positioning glass plate after the paper fingerprint registered area has passed the position R1.

If the CPU 251 confirms incompletion of the paper fingerprint information reading processing (NO in step S2303), the CPU 251 repeats the processing of step S2303.

In step S2305, the CPU 251 causes the optical unit 212 to move toward the position R2 in front of the leading edge of the document.

In step S2306, the CPU 251 causes the optical unit 212 to stop at the position R2 and start reading an image on the first document sheet in the feeding-reading mode while the document feeder 201 resumes conveying the document sheet. In this case, the optical unit 212 performs ordinary document reading processing by performing gain adjustment on a read image signal with an ordinary gain adjustment value for an ordinary image reading operation to obtain image data.

If the CPU 251 determines that the next document sheet is present (YES in step S2307), the processing proceeds to step S2308. In step S2308, the CPU 251 increments N by 1 (N=N+1) and, after completing the reading of the image on the first document sheet, returns the optical unit 212 to the position R1. Then, in step S2302 (i.e., after a leading edge of the second document sheet reaches the read sensor S5), the CPU 251 causes the optical unit 212 to start reading of paper fingerprint information at the position R1 while the document feeder 201 conveys the document sheet.

If the CPU 251 determines that the next document sheet is not present (NO in step S2307), the document feeder 201 discharges the read final document and completes the reading operation.

<Combined Paper Fingerprint Information Collation and Image Reading Processing 2 Performed by the Document Feeder>

Figure 33:
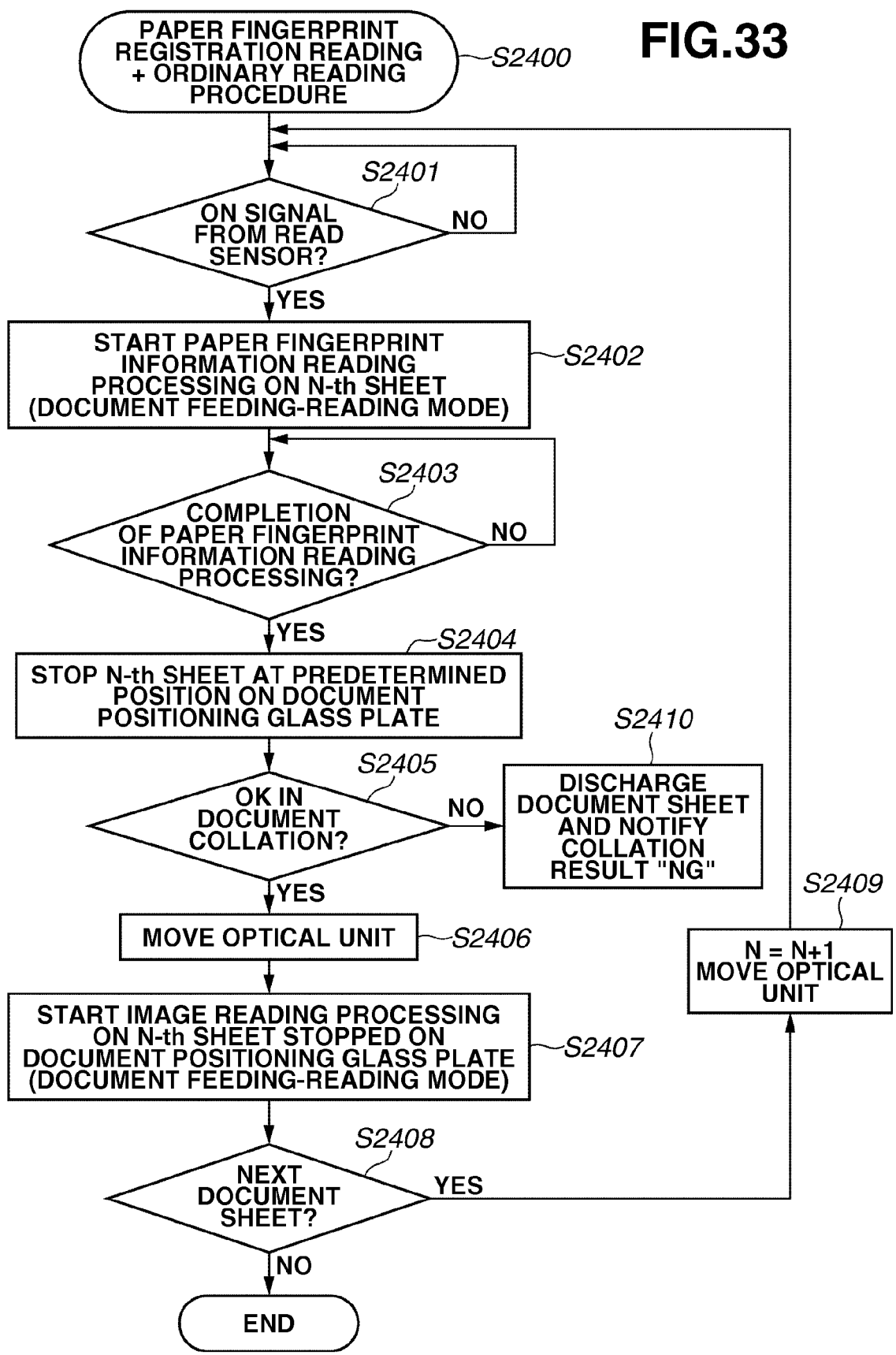
FIG. 33 illustrates combined paper fingerprint reading and ordinary reading processing according to an exemplary embodiment of the present invention.

The document feeder 201 performs the following reading processing when a user clicks on the paper fingerprint information collation tab 956 to validate paper fingerprint information collation and inputs an authenticity management number to generate a plurality of copies of the document. For example, a user inputs an authenticity management number for all pages of a document stack to generate a plurality of copies of the document. More specifically, the document feeder 201 collates paper fingerprint information of each document sheet with the authentic original document and generates a copy of the document sheets. FIG. 33 illustrates an example processing procedure for the document feeder 201.

In step S2400, the document feeder 201 starts combined paper fingerprint registration reading and ordinary reading procedure. In step S2401, after the registration rollers 206 correct skew of a leading edge of the first document sheet (N=1) separated by the separation operation procedure illustrated in FIG. 22, the CPU 251 waits for a while until the leading edge of the first document sheet reaches the read sensor S5. More specifically, if the reading signal of the read sensor S5 is OFF (NO in step S2401), the CPU 251 repeats the processing of step S2401. If the reading signal of the read sensor S5 is ON (YES in step S2401), the processing proceeds to step S2402.

In step S2402 (i.e., after the leading edge of the first document sheet reaches the read sensor S5), the CPU 251 causes the optical unit 212 to start reading paper fingerprint information at the position R1 while the document feeder 201 conveys the first document sheet. The reading position is similar to that described in the <Combined paper fingerprint information registration and image reading processing 1 performed by the document feeder>.

In step S2403, the CPU 251 determines whether the reading processing of the paper fingerprint information has been completed. If the CPU 251 confirms completion of the reading processing of the paper fingerprint information (YES in step S2403), the processing proceeds to step S2404. In step S2404, the document feeder 201 stops the document sheet on the document positioning glass plate after the paper fingerprint registered area has passed the position R1.

If the CPU 251 confirms incompletion of the paper fingerprint information reading processing (NO in step S2403), the CPU 251 repeats the processing of step S2403.

In step S2402, the CPU 301 in the controller unit 11 causes the scanner image processing unit 312 to set a gain adjustment value smaller than an ordinary gain adjustment value for the shading correction unit 500. Then, the shading correction unit 500 obtains luminance signal values by applying the above-described small gain adjustment value to image data and outputs the obtained luminance signal values to the paper fingerprint information acquisition unit 507. Then, the paper fingerprint information acquisition unit 507 acquires paper fingerprint information based on the received data. Then, the paper fingerprint information acquisition unit 507 transmits the acquired paper fingerprint information to the RAM 302 via the data bus (not illustrated).

In step S2405, the CPU 301 collates the paper fingerprint information acquired via the paper fingerprint information acquisition unit 507 with paper fingerprint information registered in a server. If the CPU 301 determines that a result of collation indicates similarity to the authentic original document (YES in step S2405), the processing proceeds to step S2406. In step S2406, the CPU 251 causes the optical unit 212 to move toward the position R2 in front of the leading edge of the document.

In step S2407, the CPU 251 causes the optical unit 212 located at the position R2 to read an image on the first document sheet in the feeding-reading mode while the document feeder 201 resumes conveying the document sheet. In this case, optical unit 212 uses an ordinary reading gain adjustment value.

If the CPU 251 determines that the next document sheet is present (YES in step S2408), the processing proceeds to step S2409. In step S2409, the CPU 251 increments N by 1 (N=N+1) and, after completing the reading of the image on the first document sheet, returns the optical unit 212 to the position R1. Then, in step S2402 (i.e., after the leading edge of the second document sheet reaches the read sensor S5), the CPU 251 causes the optical unit 212 located at the position R1 to read paper fingerprint information while the document feeder 201 conveys the document sheet. Then, the CPU 251 performs the processing of steps S2403 through S2407.

If the CPU 251 determines that the next document sheet is not present (NO in step S2408), the document feeder 201 discharges the read final document and completes the reading operation. If the CPU 301 determines that the result of collation does not indicate similarity to the authentic original document (YES in step S2405), the processing proceeds to step S2410. In step S2410, the document feeder 201 discharges the read document and the CPU 301 causes the operation unit 12 to display a warning indicating dissimilarity to the authentic original document without performing image reading processing.

In steps S2302 and S2402, the CPU 301 in the controller unit 11 causes the scanner image processing unit 312 to set a gain adjustment value smaller than the ordinary gain adjustment value for the shading correction unit 500. Alternatively, the optical unit 212 can change (reduce) the light of quantity emitted to a document when the document feeder 201 performs paper fingerprint reading. The first exemplary embodiment can employ similar lamp light quantity adjustment comparable to the gain adjustment.

In this case, while the optical unit 212 moves between the document reading position R1 and the position R2, the CPU 251 changes the quantity of light for the image reading processing as well as the quantity of light for the paper fingerprint reading processing in steps S2305, S2309, S2406, and S2409.

When the CPU 251 causes the optical unit 212 to read paper fingerprint information in steps S2302 and S2402, the optical unit 212 needs not to read the entire document. More specifically, the optical unit 212 can read a limited area including paper fingerprint.

In this case, the CPU 251 can identify a position where an image sensor completes reading of the paper fingerprint information when the CPU 251 acquires image information including paper fingerprint positional information from the document. For example, the image information including paper fingerprint positional information is a bar code or any mark specifying a position included in a document image.

Instead of detecting the image information including paper fingerprint positional information from the document, the CPU 251 can identify the paper fingerprint reading completion position based on paper fingerprint positional information input beforehand from the operation unit 12 or via the LAN 50.

According to the above-described second exemplary embodiment, an image sensor reads paper fingerprint information from a document while a document feeder conveys the document. Then, the image sensor moves to the position (R2) in front of the document while the document feeder stops the document. The image sensor, when positioned at the position (R2), reads the document while the document feeder resumes conveying the document.

Thus, an exemplary embodiment can accomplish document replacement easily and quickly without using a reversing path. Furthermore, the document feeder according to an exemplary embodiment can perform paper fingerprint information acquisition and image reading processing without using an additional image sensor.

The present invention can be applied to a system including a plurality of devices (e.g., host computer, interface device, reader, and printer) or can be applied to a single apparatus (e.g., copying machine or facsimile machine).

Furthermore, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs are usable if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a DVD (DVD-ROM, DVD-R)

Moreover, an operating system (OS) or other application software running on a computer can execute part or all of actual processing based on instructions of the programs. Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-234225 filed Sep. 10, 2007 and Japanese Patent Application No. 2007-234226 filed Sep. 10, 2007, which are hereby incorporated by reference herein in their entirety.

What is claimed is:

1. A reading method executed by a reading apparatus comprising an optical unit configured to read information from a document, the method comprising:
   reading paper fingerprint information from the document by the reading apparatus moving the document over the optical unit which is fixed at a first predetermined position;
   stopping the document at a second predetermined position after the reading of the paper fingerprint information is completed;
   moving the optical unit from the first predetermined position to a third predetermined position after the reading of the paper fingerprint information is completed; and
   reading image information from the document by the reading apparatus moving the document from the second predetermined position over the optical unit which is fixed at the third predetermined position.

2. A non-transitory storage medium storing instructions for a reading apparatus comprising an optical unit configured to read information from a document, the non-transitory storage medium storing:
   instructions for reading paper fingerprint information from the document by the reading apparatus moving the document over the optical unit which is fixed at a first predetermined position;
   instructions for stopping the document at a second predetermined position after the reading of the paper fingerprint information is completed;
   instructions for moving the optical unit from the first predetermined position to a third predetermined position after the reading of the paper fingerprint information is completed; and
   instructions for reading image information from the document by the reading apparatus moving the document from the second predetermined position over the optical unit which is fixed at the third predetermined position.

* * * * *